(12) United States Patent
Abad et al.

(10) Patent No.: US 11,733,023 B2
(45) Date of Patent: Aug. 22, 2023

(54) SYSTEM AND METHOD FOR ANGLE CALCULATIONS FOR A PLURALITY OF INERTIAL MEASUREMENT UNITS

(71) Applicant: Muvr Labs, Inc., San Francisco, CA (US)

(72) Inventors: Pablo Abad, San Francisco, CA (US); Prudhvi Tej Chinimilli, San Francisco, CA (US); Ivan Vican, Imotski (HR)

(73) Assignee: Muvr Labs, Inc., San Francisco, CA (US)

( * ) Notice: Subject to any disclaimer, the term of this patent is extended or adjusted under 35 U.S.C. 154(b) by 388 days.

(21) Appl. No.: 16/359,599

(22) Filed: Mar. 20, 2019

(65) Prior Publication Data

US 2019/0293404 A1    Sep. 26, 2019

Related U.S. Application Data

(60) Provisional application No. 62/645,788, filed on Mar. 20, 2018.

(51) Int. Cl.
| | |
|---|---|
| *G01B 7/30* | (2006.01) |
| *G01C 25/00* | (2006.01) |
| *G01P 21/00* | (2006.01) |
| *G01C 21/18* | (2006.01) |
| *G01C 21/16* | (2006.01) |

(52) U.S. Cl.
CPC ............. *G01B 7/30* (2013.01); *G01C 21/166* (2020.08); *G01C 21/18* (2013.01); *G01C 25/005* (2013.01); *G01P 21/00* (2013.01)

(58) Field of Classification Search
None
See application file for complete search history.

(56) References Cited

U.S. PATENT DOCUMENTS

| | | | | |
|---|---|---|---|---|
| 7,844,415 | B1 * | 11/2010 | Bryant | G01C 25/005 |
| | | | | 702/151 |
| 9,612,316 | B1 * | 4/2017 | Griesmeyer | G01S 5/0294 |
| 10,274,318 | B1 * | 4/2019 | Sohn | G01C 21/08 |
| 10,816,570 | B2 * | 10/2020 | Zheng | G01C 21/165 |
| 2010/0113980 | A1 * | 5/2010 | Herr | A61H 3/00 |
| | | | | 600/587 |

(Continued)

*Primary Examiner* — Arleen M Vazquez
*Assistant Examiner* — Brandon J Becker
(74) *Attorney, Agent, or Firm* — Greenberg Traurig, LLP

(57) ABSTRACT

Systems and methods for calculating mobility metrics associated to a plurality of wearable sensors in various arrangements comprising a plurality of communicatively-connected sensors comprising inertial measurement units (IMU) attached to connected bodies of a hinge or ball joint in communication with a computing device. Systems and methods for quaternion calculations comprising a first sensor's quaternion output as estimate into another sensor's quaternion calculation to improve the other sensor's quaternion estimate and vice versa. Systems and methods for data synchronization of a plurality of sensors involving building an external reference time vector and interpolating the sensor's data based on the reference time vector. Systems and methods for calculating a sensor's orientation and position based on the inertial measurements captured by the wearable sensors during hinge or ball joint movements to, at least, calculate a joint angle.

18 Claims, 24 Drawing Sheets

(56) References Cited

U.S. PATENT DOCUMENTS

| | | | |
|---|---|---|---|
| 2011/0028865 A1* | 2/2011 | Luinge | A61B 5/1126 |
| | | | 600/595 |
| 2011/0082566 A1* | 4/2011 | Herr | H02K 7/06 |
| | | | 623/24 |
| 2012/0259431 A1* | 10/2012 | Han | A61H 3/00 |
| | | | 623/24 |
| 2014/0278183 A1* | 9/2014 | Zheng | G01C 21/165 |
| | | | 702/96 |
| 2014/0288873 A1* | 9/2014 | Czompo | G01C 19/5776 |
| | | | 702/141 |
| 2016/0265937 A1* | 9/2016 | Keal | G01C 25/005 |
| 2016/0324461 A1* | 11/2016 | Hallberg | A61B 5/1121 |
| 2017/0003751 A1* | 1/2017 | Micali | G01P 15/00 |
| 2017/0138737 A1* | 5/2017 | Cordova | H04W 4/029 |
| 2017/0225033 A1* | 8/2017 | Czaja | A43B 5/04 |
| 2018/0052006 A1* | 2/2018 | Ell | G01C 21/16 |
| 2018/0292430 A1* | 10/2018 | Ell | G01C 21/165 |

* cited by examiner

Algorithm 1 Data Synchronization Algorithm

Input: D1: data stream from sensor A, D2: data stream from sensor B, $F_{nom}$: Nominal frequency required to build reference time vector.

Output: D3: synced data from sensor A and sensor B

1: $LocalMasterTimeDiff = (mean(MasterTimeA) - mean(LocalTimeA)) - (mean(MasterTimeB) - mean(LocalTimeB))$  ▷ Calculating local master time difference between two sensors using master time and local time vectors obtained D1 and D2.
2: $LocalTimeB = LocalTimeB - LocalMasterTimeDiff$  ▷ Modifying local time vector of sensor B based on the calculated local master time difference
3: $FirstTimeA = LocalTimeA(start)$  ▷ Record the time at which local clock of sensor A measures the first sample of D1
4: $FirstTimeB = LocalTimeB(start)$  ▷ Record the time at which local clock of sensor B measures the first sample of D2
5: $tref = min(FirstTimeA, FirstTimeB) + max(FirstTimeA, FirstTimeB) - 0.2$
6: loop
7: $tref = tref + \frac{1}{F_{nom}}$  ▷ Building reference time vector to synchronize the data stream of two sensors
8: end loop
9: $[OutStreamA, OutStreamB] = findLinearInterpolation(D1, D2, tref)$
10: $D3 = concatenate(OutStreamA, OutStreamB)$

Fig. 17A

Algorithm 2 Calculate Sensors Position and Orientation Algorithm

Input: TrainData: Training data collected during activity, M: number of update iterations required for optimization technique to converge, N: number of iterations required for various initialization of the sensor orientation and position using random number generator.

Output: x: A four element vector containing two sensors orientation, o: A six element vector containing two sensors position.

1: loop
2:    $x = rand(4,1) * 2\pi$    ▷ Initializing sensors orientation using random number generator
3:    $o = rand(6,1) * 0.5 - 0.25$    ▷ Initializing sensors position using random number generator
4:    loop
5:      $Updatedx = UpdateSensorPositionOrientation(TrainData)$    ▷ Update x using optimization technique on the training data collected
6:      $Updatedo = UpdateSensorPositionOrientation(TrainData)$    ▷ Update o using optimization technique on the training data collected
7:      $ej = CalculateSensorOrientationError(Updatedx)$    ▷ Find orientation error using updated orientation estimate Updatedx in the constrained optimization equation
8:      $eo = CalculateSensorPositionError(Updatedo)$    ▷ Find orientation error using updated orientation estimate Updatedx in the constrained optimization equation
9:      $xCandidate = Updatedx$    ▷ Store final updated x after convergence
10:     $oCandidate = Updatedo$    ▷ Store final updated o after convergence
11:     $ejrms = rms(ej)$    ▷ Find root means square of the ej
12:     $eorms = rms(eo)$    ▷ Find root means square of the eo
13:    end loop
14:    $Minejrms = min(ejrms)$    ▷ Find minimum of the ejrms
15:    $Mineorms = min(eorms)$    ▷ Find minimum of the eorms
16:    $[x, o] = ChooseBestPositionOrientation(Minejrms, Mineorms)$    ▷ Choose best x and o based on the minimum eorms and ejrms
17: end loop

Fig. 19A

SYSTEM AND METHOD FOR ANGLE CALCULATIONS FOR A PLURALITY OF INERTIAL MEASUREMENT UNITS

CROSS-REFERENCE TO RELATED APPLICATIONS

This application claims the benefit of, and priority to U.S. provisional application 62/645,788 titled, "SYSTEM AND METHOD FOR MULTI-SENSOR ANGLE CALCULATIONS FOR A PLURALITY OF INERTIAL MEASUREMENT UNITS" filed on Mar. 20, 2018, the entire specifications of which are incorporated herein by reference.

BACKGROUND OF THE INVENTION

Field of the Art

The disclosure relates to the field of sensor processing, and more particularly to the field of multi-sensor angle calculations for a plurality of inertial measurement units.

Discussion of the State of the Art

Madgwick details an algorithm to quickly compute the quaternion of a single IMU using accelerometer and gyroscope data. The quaternion provides a mathematical reference between the Earth coordinate frame and the coordinate frame of an IMU. The Madgwick algorithm cannot be directly used in the dynamic knee angle calculation due to its limitations related to uncertainty in the yaw of both sensors relative to the Earth reference frame if the quaternions of the sensors are computed independently.

Given that the Madgwick algorithm relies solely on accelerometer and gyroscope data, the quaternion it produces will have completely arbitrary yaw, anywhere from 0° to 360° along the North-East-South-West standard compass coordinates. Let two sensors on the thigh and calf be denoted as sensor A and sensor B and $v_A$ and $v_B$ be vectors in the sensor A and sensor B frames, respectively. One cannot accurately compute the angle between $v_A$ and $v_B$ if the N-S-E-W directionality of both vectors is unknown.

A significant challenge is that of syncing data from multiple sensors to derive accurate mobility metrics involving computations utilizing IMU data from multiple sources that must have been sampled at nearly the same instant in time. Among others, challenges include (1) time delay between when Sensor A and Sensor B started to collect data, (2) delay between the time when the data were sampled and when the data were received by the smartphone, (3) differences in the sample rate of Sensor A and Sensor B; and, (4) the drift of clock A relative to clock B.

Another significant challenge is that of obtaining accurate measurements of the sensor positions and orientations, both with respect to other sensors and with respect to joint axes. The sensor positions and orientations are critical for accurate assessment of static and dynamic performance, however manual measurement methods are limited and imprecise.

What is needed are systems and methods for accurately calculating mobility metrics that overcome the challenges above.

SUMMARY OF THE INVENTION

Accordingly, the inventor has conceived and reduced to practice, in a preferred embodiment of the invention, a system and method to calculate metrics (for example, knee angle, stride length, step length, and cadence) using a plurality of inertial measurement units (IMUs) for a hinge or ball joint. In an embodiment addressing metrics for a human joint (for example, a knee), one IMU may be worn above the knee, and the other is worn below the knee.

A wearable sensor system comprising a plurality of communicatively-connected sensors comprising inertial measurement units (IMUs) are placed on connected bodies of a hinge or ball joint (for example, the thigh and calf of a human leg) and in communication with a computing device (for example, a mobile computing device such as a smartphone). Calculations of mobility metrics (for example, knee angle, step length, stride length, cadence, and the like) are performed in various arrangement either by processors of sensors, by a local or remote computing device, or smartphone. Systems and methods disclosed herein comprise (1) quaternion calculations comprising inputs one of a first sensor's quaternion output as estimate into another sensor's quaternion calculation to improve the other sensor's quaternion estimate and vice versa, (2) systems and methods for data synchronization of a plurality of sensors involving building an external reference time vector and interpolating the sensor's data based on the reference time vector, (3) automatic calibration to calculate a sensor's orientation and position based on the inertial measurements captured by the wearable sensor system during hinge or ball joint movements to, at least, calculate a joint angle.

Accordingly, a yaw constraint between the quaternions $q_A$ and $q_B$, must be calculated and applied before we can calculate the angle between vectors $v_A$ and $v_B$. Quaternion calculation algorithm as disclosed herein solves the above-mentioned problem by using $q_A$ as an input to the calculation of $q_B$. A constraint is applied between the yaw of $q_A$ and $q_B$ using information known a priori.

The approach primarily consists of two main blocks: quaternion A calculation and quaternion B calculation. In each block, the measurement from accelerometer and gyroscope are taken as inputs and a fusion algorithm is applied to provide a quaternion estimate of the sensor. An estimation orientation of the earth frame relative to the sensor frame is obtained through the fusion of the separate orientation calculations given by accelerometer and gyroscope. The quaternion calculation block estimates quaternion estimates by integrating the derivative of the quaternion measured by the gyroscopes, with the magnitude of the gyroscope measurement error removed in a direction based on accelerometer measurements. For accelerometer measurements, the first step is to compute the Jacobian and objective function in the optimization formulation to identify unique sensor orientation with respect to earth reference frame. Then the next step is to compute the divergence factor and the norm of the gradient of the objective function. After this step, the fusion algorithm is applied to the estimates based on the gyroscope and accelerometer measurements.

The novelty of systems and methods disclosed herein is that the obtained $q_A$ estimate from the quaternion A calculation block is used as an input to the compute Jacobian and objective function step of quaternion B calculation block. This input will impose additional yaw constraint between the quaternions $q_A$ and $q_B$. Another advantage of this approach is that the flexibility to use $q_B$ estimate from the quaternion B calculation block as an input to the compute Jacobian and objective function step of quaternion A calculation block. Therefore, there is a flexibility to interchange the quaternion A and quaternion B calculation blocks based on certain embodiments.

Though embodiments described herein primarily refer to a human joint such as a knee, one with ordinary skill in the art will appreciate that systems and methods described herein apply to any hinge or spherical joint of a human, animal, robot, or mechanical device.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting of the scope of the invention or the claims herein in any way.

FIG. 17A is an exemplary pseudo code subroutine for data synchronization algorithm that synchronizes data recorded by a plurality of sensors, according to a preferred embodiment of the invention;

FIG. 19A is an exemplary pseudo code subroutine for calculating sensor position and orientation algorithm, according to a preferred embodiment of the invention;

DETAILED DESCRIPTION

Figure 1:
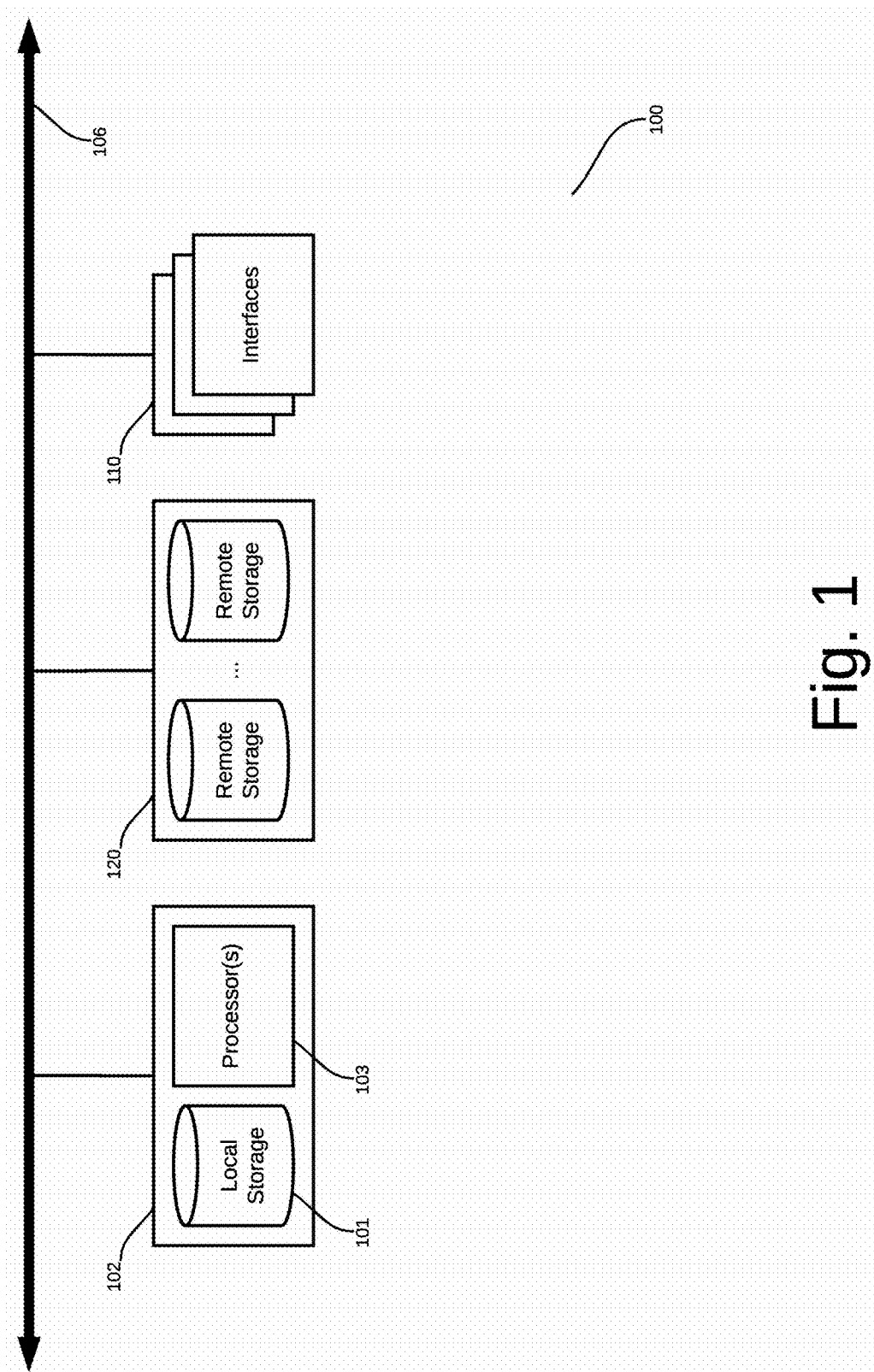
FIG. 1 is a block diagram illustrating an exemplary hardware architecture of a computing device used in an embodiment of the invention.

The inventor has conceived, and reduced to practice, a system and method for multi-sensor angle calculations for a plurality of inertial measurement units.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of the sections provided in this patent application and the title of this patent application are for convenience only; and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random-access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
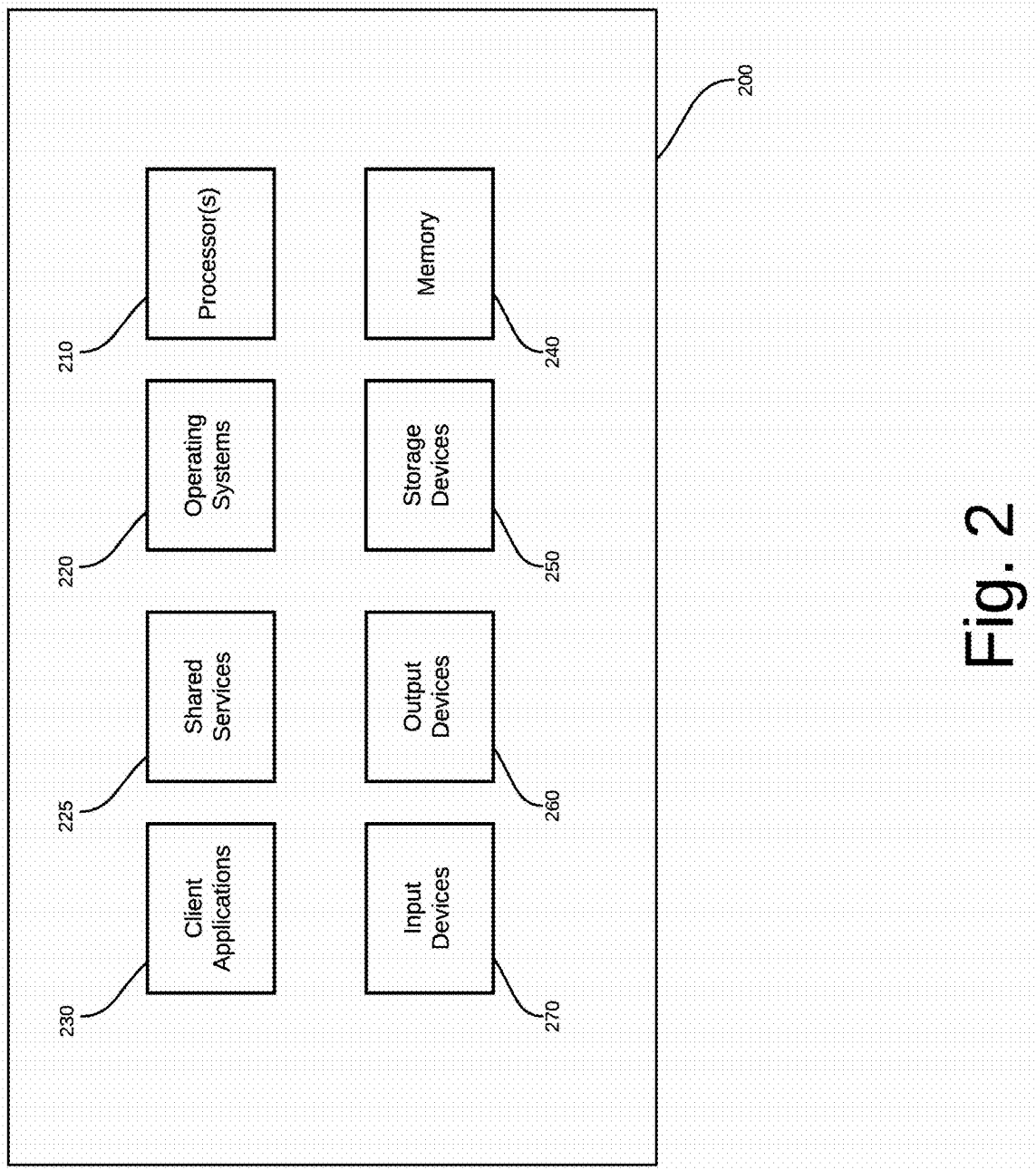
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200 and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
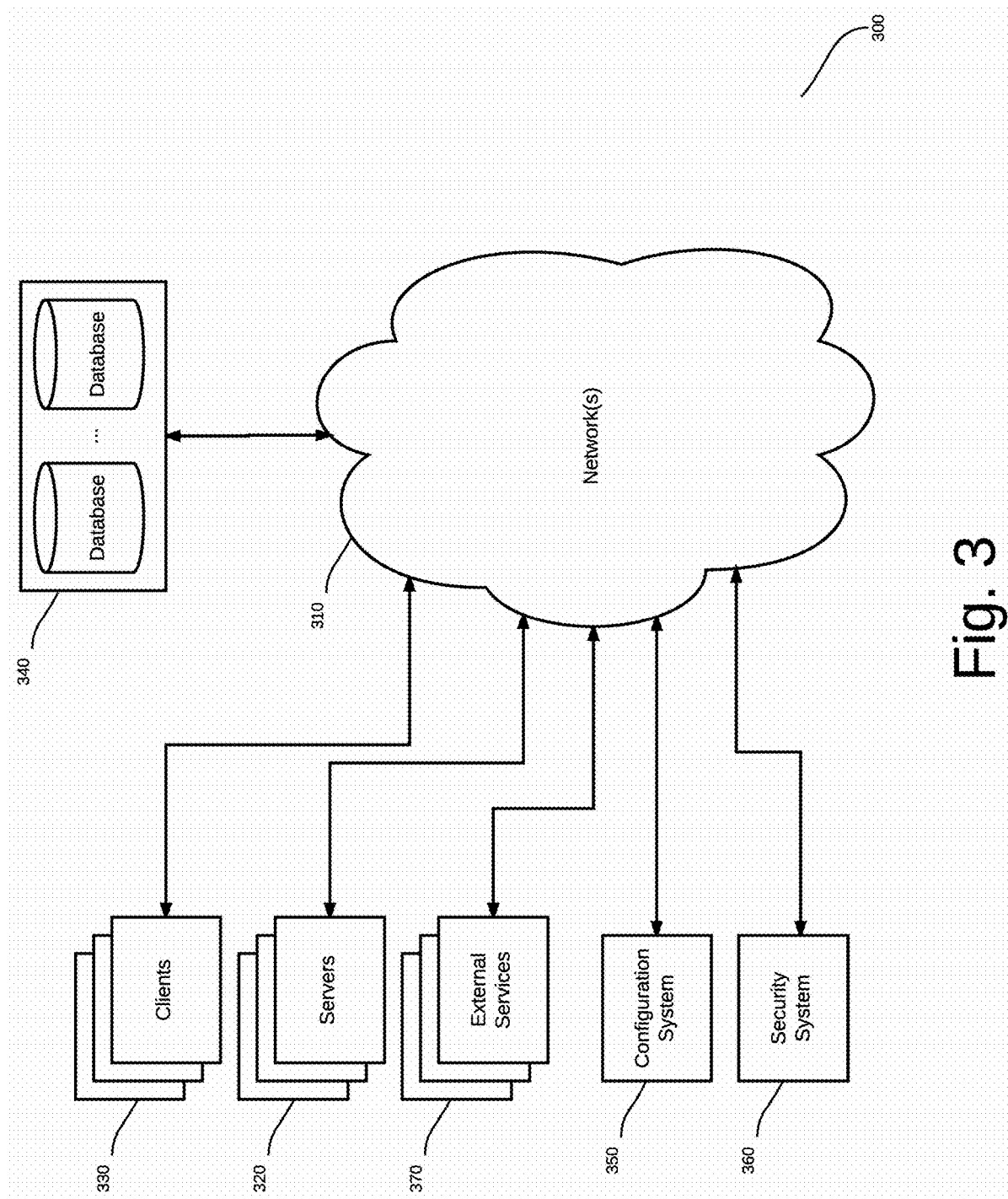
FIG. 3 is a block diagram illustrating an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, Wimax, LTE, and so forth), a short-range wireless network (such as Bluetooth™, NFC, and the like), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone, mobile device, or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
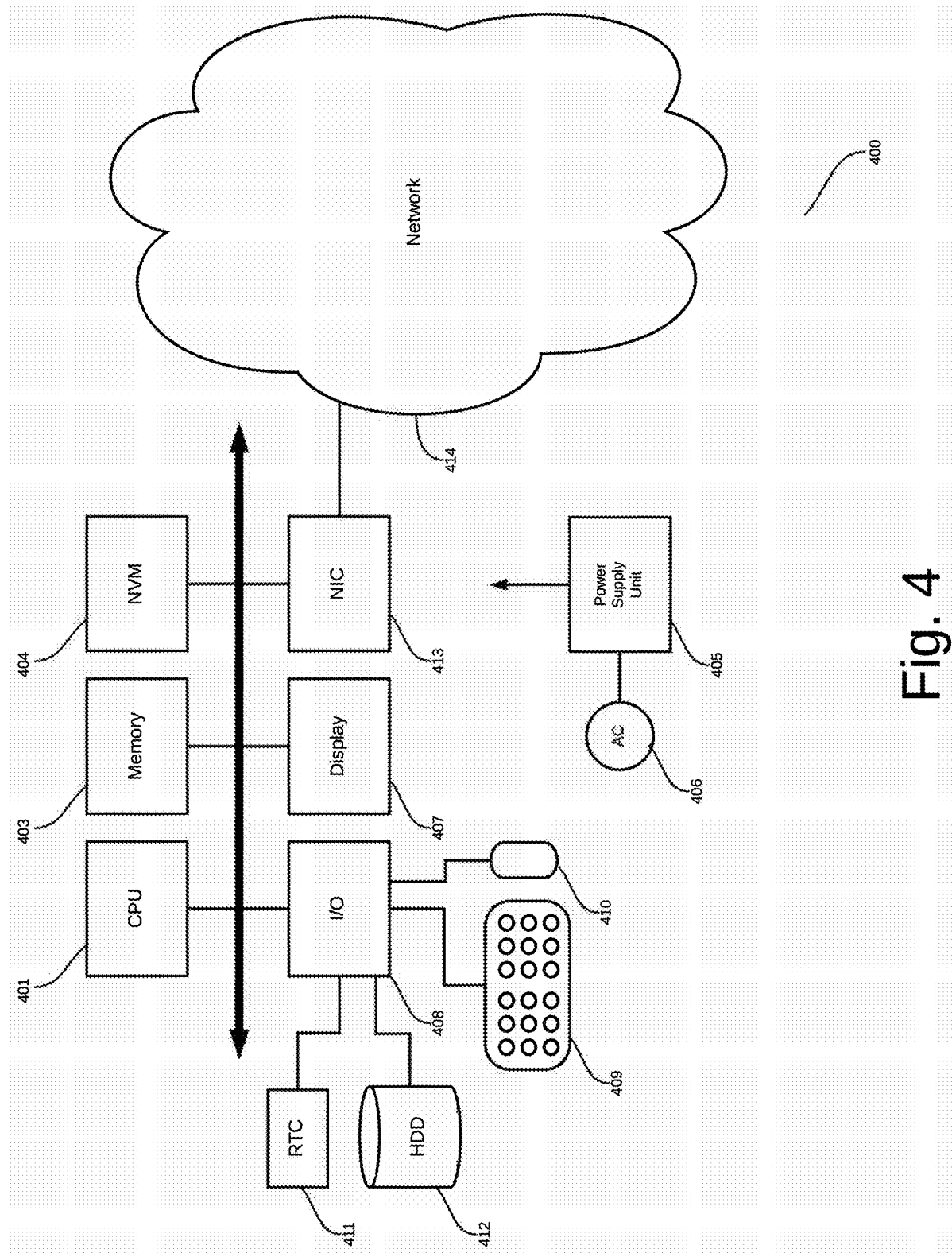
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
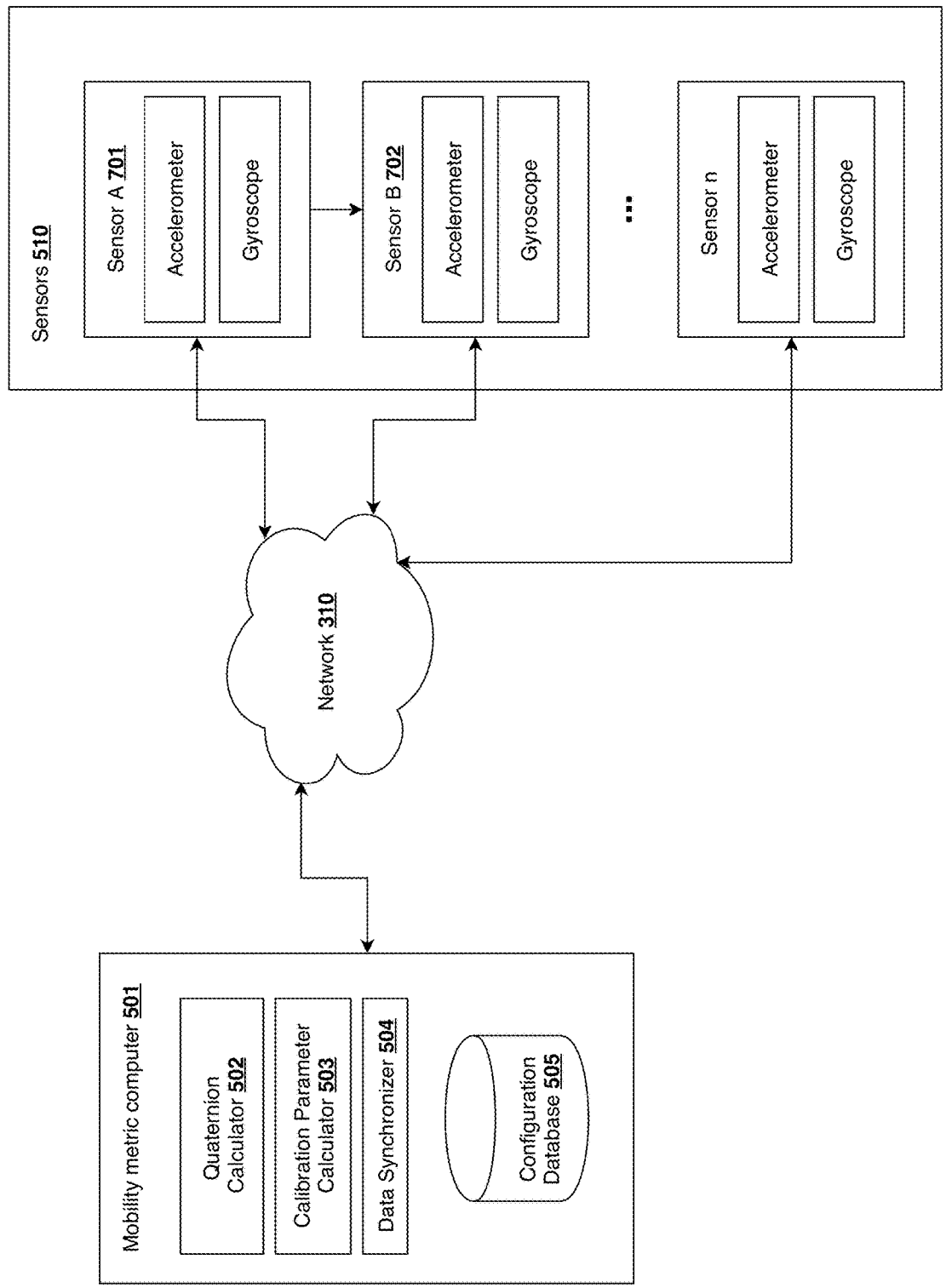
FIG. 5 is a block diagram illustrating an exemplary architecture of an angle calculation system, according to a preferred embodiment of the invention.

FIG. 5 is a block diagram illustrating an exemplary architecture of an angle calculation system, according to a preferred embodiment of the invention. According to the embodiment, a network-connected metric calculation system comprises at least one processor 401, at least one memory 403, and a plurality of programming instructions that when executed by the at least one processor 401 cause the at least one processor 401 to compute a plurality of metrics for a hinge or ball joint of a human, animal, robot, or mechanical device comprising, at least, mobility metric computer 501 comprising quaternion calculator 502, calibration calculator 503, data synchronizer 504, and configuration database 505. In a preferred embodiment, mobility metric computer 501 is operable to connect to network 310 (for example, the Internet, WiFi, a short-range wireless interconnect protocol network such as Bluetooth™, NFC, or the like, or a combination thereof) whereby a plurality of sensors 510, also communicatively connected to network 310, are operable for communication to mobility metric computer 501.

Quaternion calculator 502 comprises a plurality of programming instructions that when executed by the at least one processor 401 cause the processor to a calculate a plurality of quaternion to implement a yaw constraint between a first quaternion and a second quaternion. Quaternion calculations comprise may use a measurement from accelerometer and gyroscope associated to a sensor 510 taken as inputs and applied in a fusion algorithm (referring to FIG. 6) to provide a quaternion estimate for a sensor 510.

Figure 19:
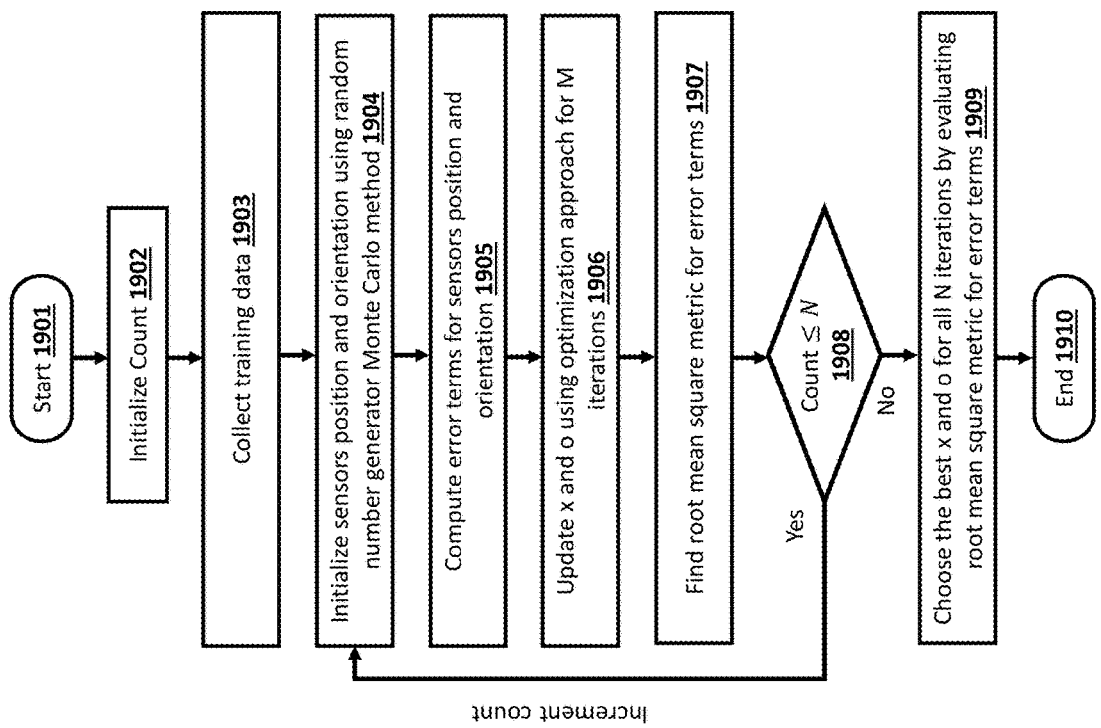
FIG. 19 is a flow diagram illustrating a method for calculating position and orientation of a plurality of sensors, according to a preferred embodiment of the invention.

Calibration parameter calculator 503 comprise programming instructions that when executed by the at least one processor 401 calculates sensors position and orientation by calibrating training data during joint movements (for example, leg movements by a human, animal, or mechanical robot). Accordingly training data may be collected from sensors placed on or near the joint. In this regard, an initial orientation and position of the sensors may be initialized using information known a priori or using a sequence of random numbers, for example, using a Monte Carlo algorithm. After initialization, error terms of a constrained optimization may be computed using collected training data. Sensor position and orientation may be updated using the optimization algorithm for M iterations. A root mean square of the error terms may be computed for each of the N iterations i.e., for different initialization of the sensors' position and orientation. Then, for all N iterations, the best sensors position, and orientation estimate is chosen based on a minimum of the root mean square of the error terms computed. An exemplary method for calculating sensors position and orientation is shown in FIGS. 19 and 19A.

Data synchronizer 504 synchronizes data from a plurality of sensors 510 data streams and use synced data, from data synchronization. In a preferred embodiment, data synchronization receives data streamed from a plurality of sensors 510. A local master time difference may be calculated to compensate for an initial time delay between when a first sensor 701 and second sensor 702 started to collect sensor data. Accordingly, an assumption may be made that a local time associated to first sensor 701 is designated to be a true time. As such, a local time associated to second sensor 702 may be adjusted using a computed local master time difference. An external reference time vector may be built using a preconfigured, or dynamically calculated, fixed nominal frequency. This external time reference vector may be used to overcome the limitation of the master times recorded by mobility metric computer 501 as the master times may be variable, as it is difficult to identify sampling frequency. Linear interpolations may be performed for reference time vector for first sensor 701 and second sensor 702 and analyzed to determine if the reference time value falls between the local time bounds of the plurality of sensors 510. If yes, the linear interpolation may be performed. If not, data points may be ignored. Final linear interpolated data points of the plurality of sensors may be concatenated and stored as the synced data.

Configuration database 505 may comprise a data store 340 for storing system variables, preconfigured nominal frequencies, sensor information, user information, and the like.

Sensors 510 may be devices comprising an inertial measurement unit (IMU) that measures and reports a body's specific force, angular rate, and sometimes the magnetic field surroundings the body, using a combination of accelerometers and gyroscopes, sometimes also magnetometers. Sensors 510 function by detecting linear acceleration using one or more accelerometers and rotational rates using one or more gyroscopes. In some embodiments, sensors 510 may each comprise a magnetometer which is commonly used as a heading reference, however these are not used in some embodiments. A typical configuration of sensors 510 may each comprise at least one accelerometer, gyro, and magnetometer per axis for each of the three vehicle axes: pitch, roll and yaw. In a preferred embodiment, the use of magnetometer data is avoided as sensor readings since they are easily affected by nearby magnetic fields emanating from common electronics. Instead, in a preferred embodiment, systems and methods disclosed herein focus on accelerometer and gyroscope data.

Figure 6:
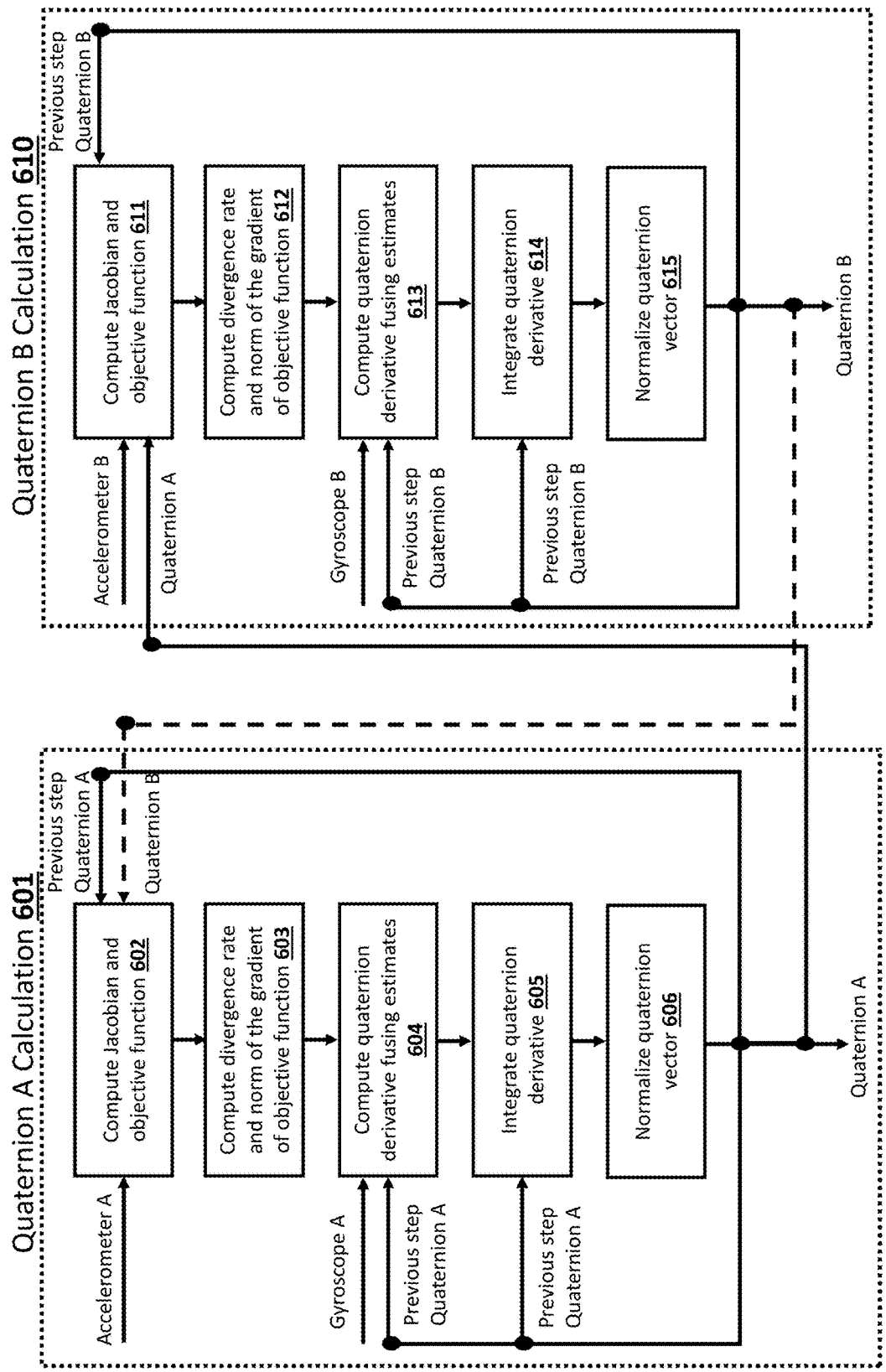
FIG. 6 is a block diagram outlining a quaternion calculation approach to implement a yaw constraint between a first quaternion and a second quaternion, according to a preferred embodiment of the invention.

FIG. 6 is a block diagram outlining a quaternion calculation approach to implement a yaw constraint between a first quaternion and a second quaternion, according to a preferred embodiment of the invention. According to the embodiment, the above-mentioned problem by using a first quaternion (hereinafter also referred to as quaternion A or $q_A$) as an input to the calculation of a second quaternion (hereinafter also referred to as quaternion B or $q_B$). A constraint is applied between the yaw of $q_A$ and $q_B$ using information known a priori.

As illustrated, an approach comprises quaternion A calculation 601 and quaternion B calculation 610. In each block 601 and 610, a measurement from accelerometer and gyroscope are taken as inputs and fusion algorithm is applied to provide a quaternion estimate of the sensor. An estimation orientation of the earth frame relative to the sensor frame is obtained through the fusion of the separate orientation calculations given by accelerometer and gyroscope. The quaternion calculation block estimates quaternion estimates by integrating the derivative of the quaternion measured by the gyroscopes, with the magnitude of the gyroscope measurement error removed in a direction based on accelerometer measurements. For accelerometer measurements, a first step is to compute the Jacobian and objective function 602 and 611 in an optimization formulation to identify unique sensor orientation with respect to earth reference frame. In 603 and 612, a divergence factor is computed and the norm of the gradient of the objective function. In 604 and 613, a fusion algorithm is applied to the estimates based on the gyroscope and accelerometer measurements.

Advantageously, a novel approach of the quaternion calculation algorithm is that the obtained $q_A$ estimate from the quaternion A calculation 601 is used as an input to the compute Jacobian and objective function step of quaternion B calculation 610 (depicted as the solid elbow dashed line passing from quaternion A calculation 601 to quaternion B calculation 610). This input will impose additional yaw constraint between the quaternions $q_A$ and $q_B$. Another advantage of this approach is that the flexibility to use $q_B$ estimate from the quaternion B calculation 610 as an input to the compute Jacobian and objective function step of quaternion A calculation 601 (depicted as the dashed elbow line passing from quaternion B calculation 610 to quaternion A 601). Accordingly, there is a flexibility to interchange the quaternion A 601 and quaternion B 610 calculation blocks.

Figure 7:
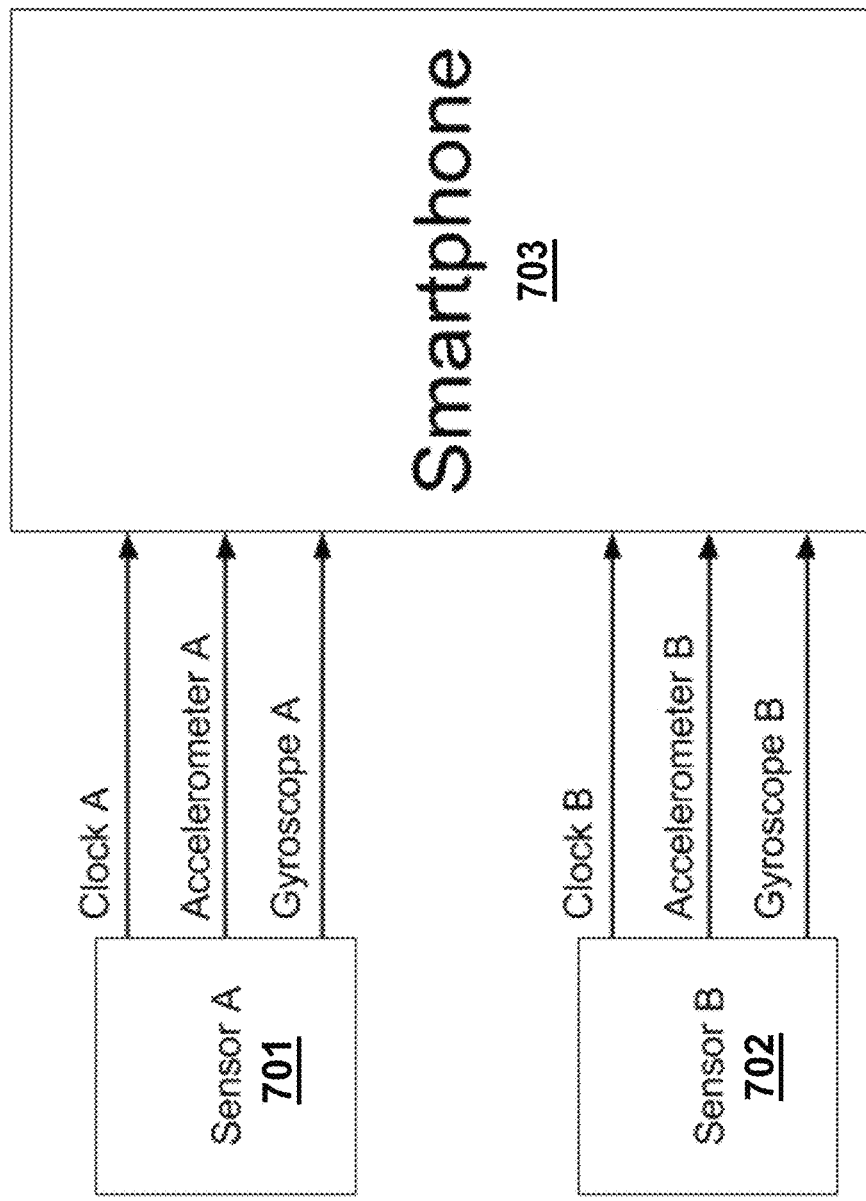
FIG. 7 is a block diagram illustrating an exemplary architecture depicting communications of a clock, an accelerometer, a gyroscope, and a plurality of sensors, according to a preferred embodiment of the invention.

FIG. 7 is a block diagram illustrating an exemplary architecture depicting communications of a clock, an accelerometer, a gyroscope by a plurality of sensors 510, according to a preferred embodiment of the invention. According to the embodiment, the exemplary system comprises the plurality of wireless sensors 510 comprising an IMU and a smartphone. It should be noted that smartphone, mobile device herein may be used interchangeably. The clock, accelerometer, and gyroscope data from each sensor 701 and sensor 702 is transmitted to smartphone 703 comprising algorithms disclosed herein to compute the desired mobility metrics (e.g., knee angle, stride length, step length, and cadence), for example as described in FIG. 6. The high-level architecture can be designed in a plurality of configurations using two sensors 701 and 702 as illustrated in FIGS. 7-11; however, in other embodiments, more than two sensors may be used (as illustrated in FIG. 5). It should be noted that in some embodiments, sensors A 701 and B 702 may be interchanged, and the notation A and B are used for convenience when referring to a first and a second sensor. It should be noted that smartphone 703 may be any portable computing device comprising a processor, memory, and a plurality of programming instructions that when executed by the processor, perform the algorithms disclosed herein. In some embodiments, smartphone 703 may be a specially programmed computer device, referred to as a mobile device, and be local or remote to sensors 701 and 702. In other embodiments, sensors 701 and 702 may each be an internet of things (IoT) device capable of communicating directly with other sensors 510 and/or network 310. In this regard, smartphone 703 may be a software as a service system capable of communicating and calculating data from plurality of sensors 510.

Figure 8:
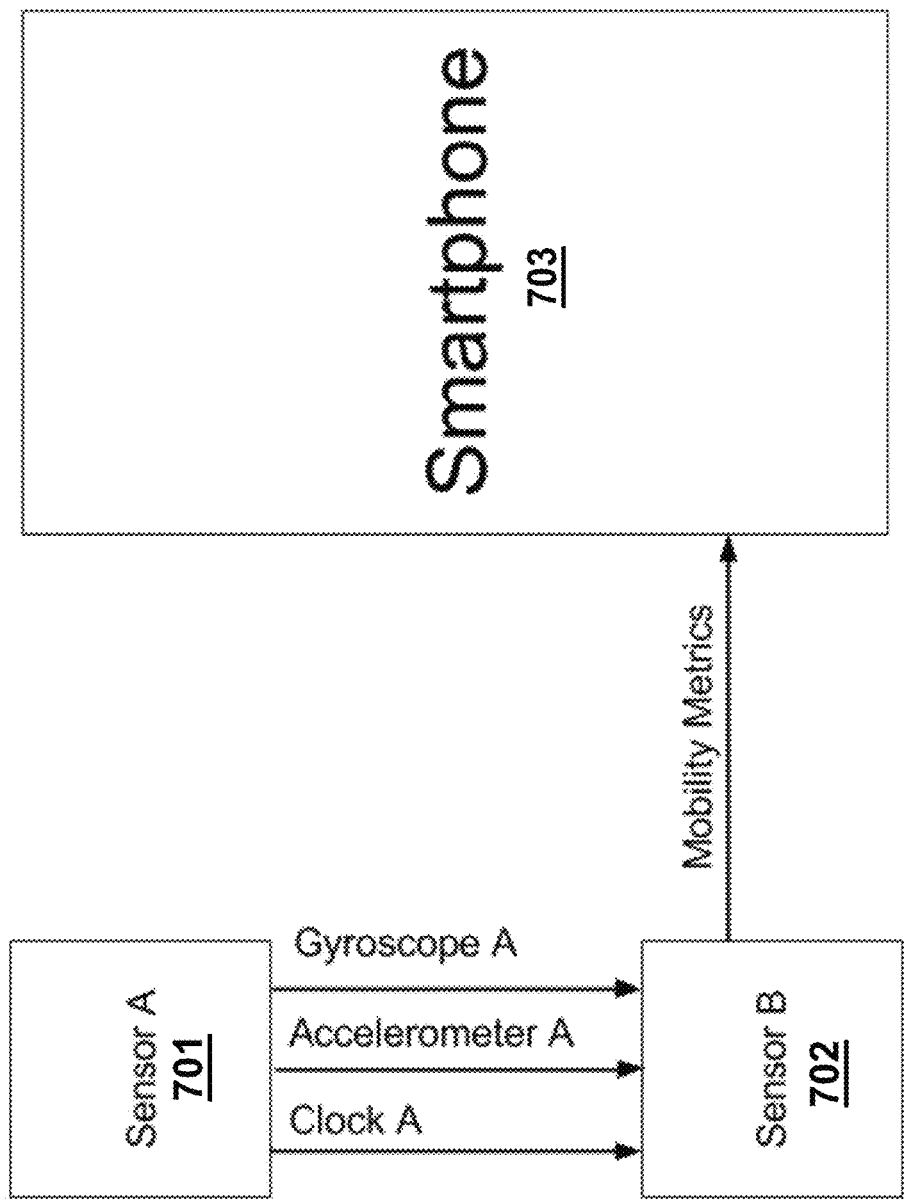
FIG. 8 is a block diagram illustrating an exemplary architecture depicting an alternative arrangement for communications of a clock, an accelerometer, a gyroscope, and a plurality of sensors, according to an embodiment of the invention.

FIG. 8 is a block diagram illustrating an exemplary architecture depicting an alternative arrangement for communications of a clock, an accelerometer, a gyroscope, from a plurality of sensors, according to an embodiment of the invention. According to the embodiment, first sensor 701 sends clock, accelerometer and gyroscope data to the second sensor. Second sensor 702 computes quaternions of the sensors qA and qB and mobility metrics using the data of both the sensor. Second sensor 702 then sends mobility metrics to the smartphone.

Figure 9:
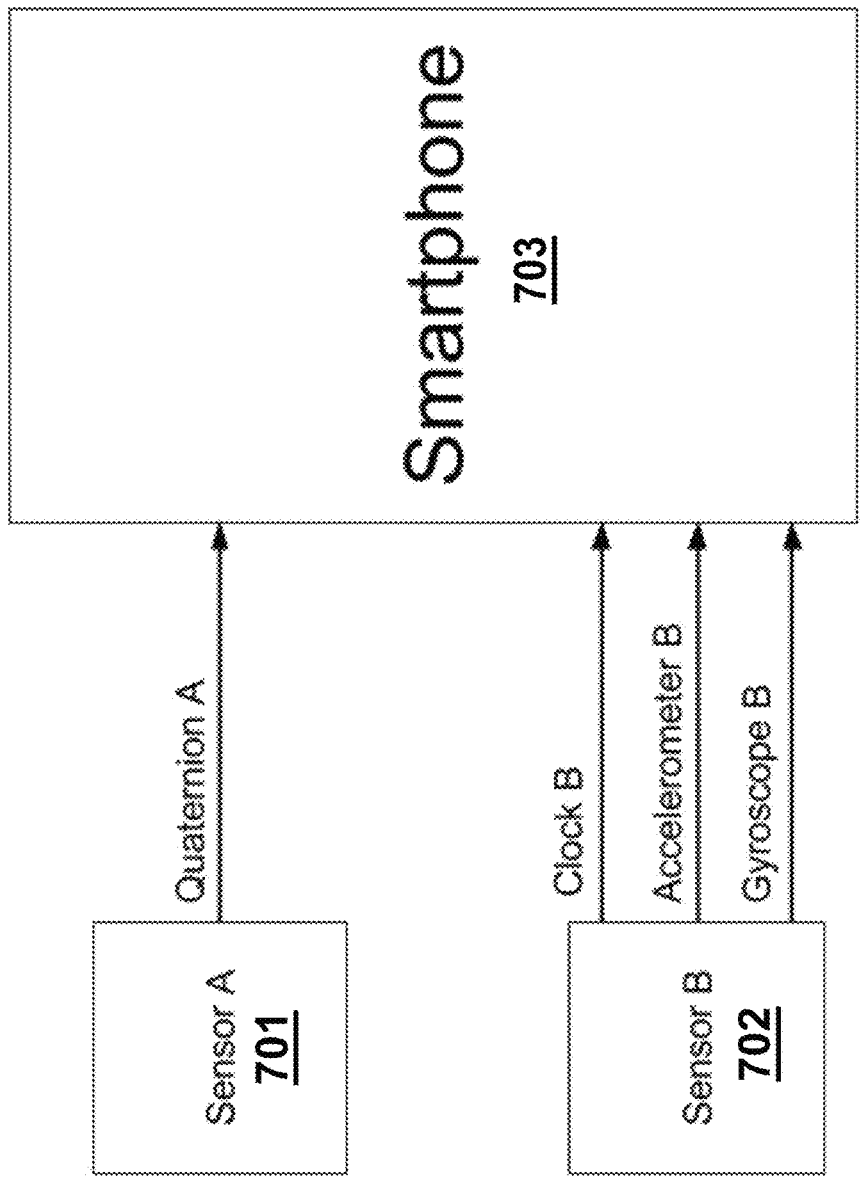
FIG. 9 is a block diagram illustrating another exemplary architecture depicting an alternative arrangement for communications of a clock, an accelerometer, a gyroscope, and a plurality of sensors, according to an embodiment of the invention.

FIG. 9 is a block diagram illustrating another exemplary architecture depicting an alternative arrangement for communications of a clock, an accelerometer, a gyroscope, and a plurality of sensors, according to an embodiment of the invention. According to the embodiment, first sensor 701 computes quaternion A using first sensor 701's accelerometer and gyroscope data and sends to smartphone 703. In parallel, second sensor 702 sends clock, accelerometer and gyroscope data to smartphone 703. Computation of quaternion B and mobility metrics are performed by smartphone 703.

Figure 10:
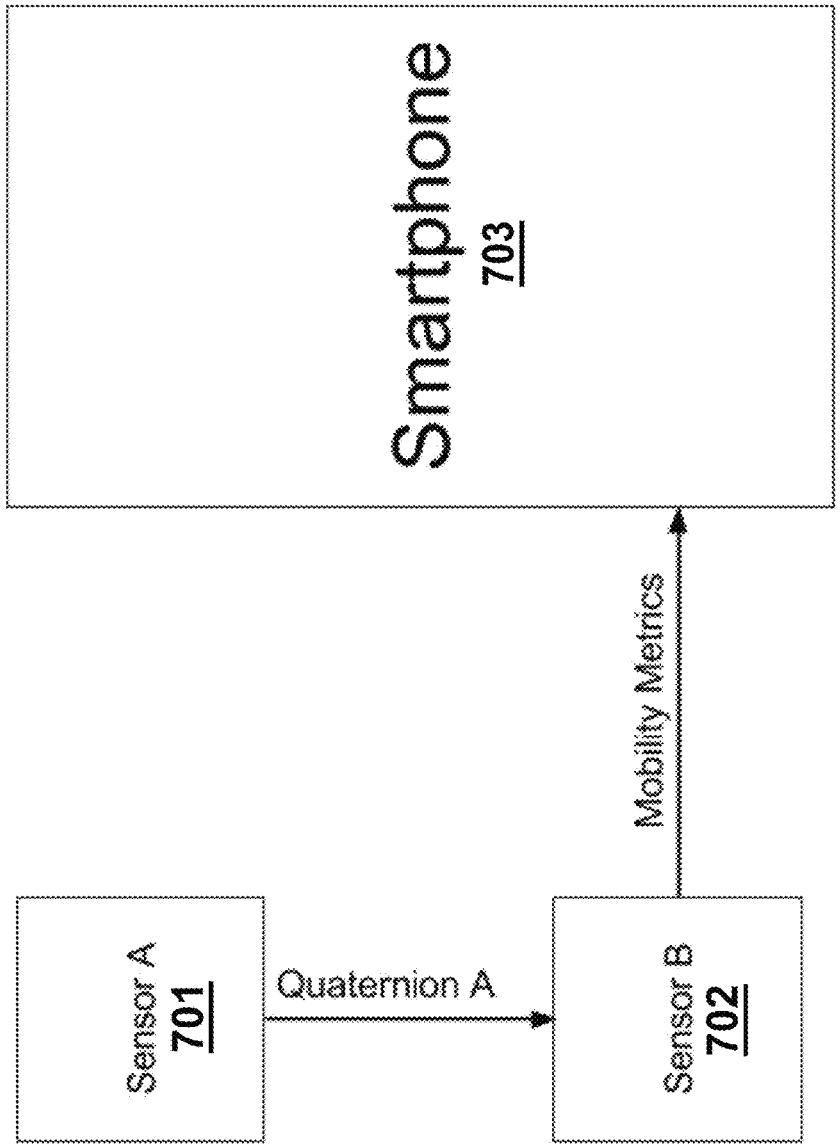
FIG. 10 is a block diagram illustrating another exemplary architecture depicting an alternative arrangement for communications of a clock, an accelerometer, a gyroscope, and a plurality of sensors, according to an embodiment of the invention.

FIG. 10 is a block diagram illustrating another exemplary architecture depicting an alternative arrangement for communications of a clock, an accelerometer, a gyroscope, by a plurality of sensors, according to an embodiment of the invention. According to the embodiment, first sensor 701 computes quaternion A using the first sensor's accelerometer and gyroscope data and sends the result to second sensor 702. Second sensor 702 computes quaternion B using the second sensor's accelerometer and gyroscope data. Further, second sensor 702 computes mobility metrics based on both qA and qB estimates and sends the metrics to smartphone 703.

Figure 11:
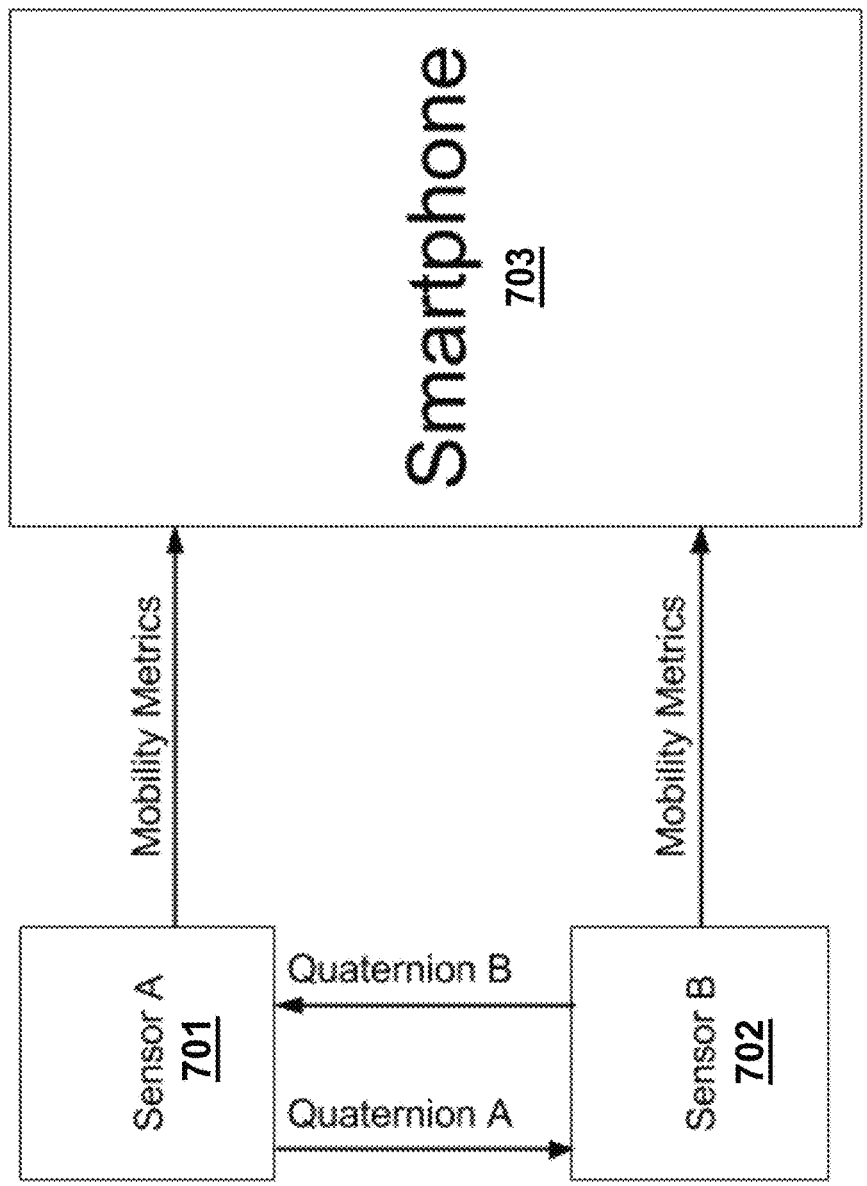
FIG. 11 is a block diagram illustrating another exemplary architecture depicting an alternative arrangement for communications of a clock, an accelerometer, a gyroscope, and a plurality of sensors, according to an embodiment of the invention.

FIG. 11 is a block diagram illustrating another exemplary architecture depicting an alternative arrangement for communications of a clock, an accelerometer, a gyroscope, by a plurality of sensors, according to an embodiment of the invention. According to the embodiment, first sensor 701 and second sensor 702 may compute their respective quaternion estimate locally based on their accelerometer and gyroscope data and communicate their respective quaternion values to each other. The mobility metrics can be computed by either first sensor 701 or second sensor 702 depending upon battery level, CPU load, or other constraints and then communicate with the smartphone.

Figure 12:
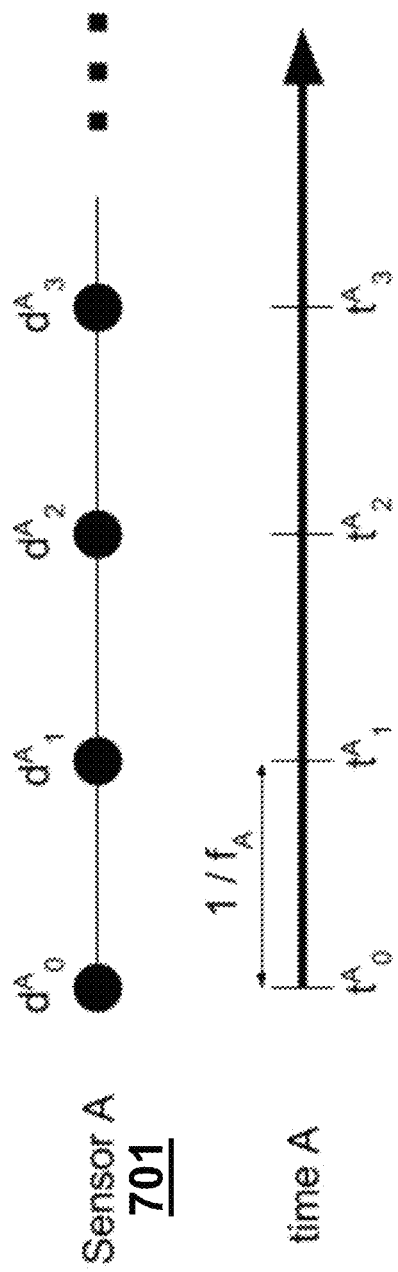
FIG. 12 is a diagram illustrating data collected by a sensor with a sampling frequency, according to an embodiment of the invention.
Figure 13:
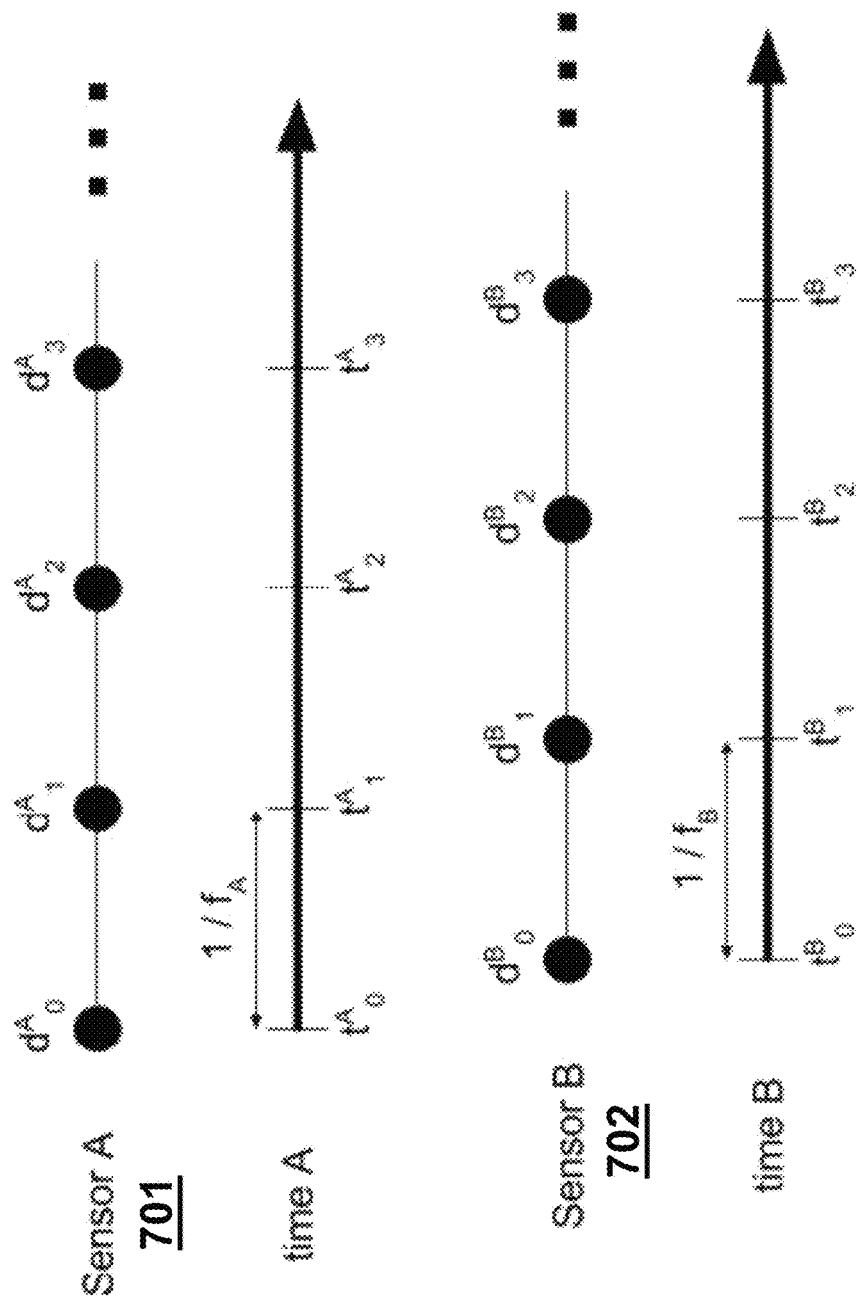
FIG. 13 is a diagram illustrating data collected by a plurality of sensors, according to an embodiment of the invention.

FIG. 12 is a diagram illustrating data collected by a sensor with a sampling frequency, according to an embodiment of the invention. According to the embodiment, data collected by first sensor 701 with a sampling frequency $f_A$ is shown. Let $t_0^A$ be the time the first data point from when first sensor 701 was sampled measured by the clock of the first sensor, $d_i^A$ is the data collected by first sensor 701 at time $t_i^A$. The same definitions can be extended to second sensor 702, where we will use index j instead of i. This is illustrated graphically in combination with first sensor 701 in FIG. 13.

Figure 14:
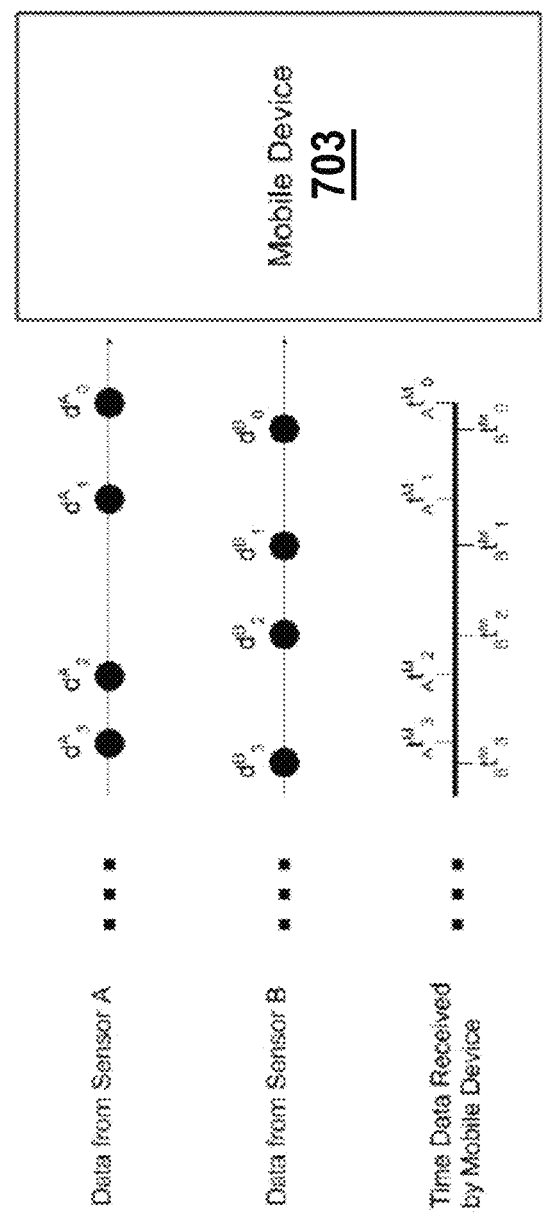
FIG. 14 is a diagram illustrating a mobile device receiving data wirelessly from a plurality of sensors.

Once the data are collected by sensors 701 and 702, they are transmitted wirelessly (e.g., via short-range wireless interconnect protocol) to mobile device 703. Wireless communications introduce delays between when data are collected by a sensor and when data are received by mobile device 703, and the delays are not always constant. Let $_At_i^M$ be the time at which the mobile device receives data point $d_i^A$, and $_Bt_j^M$ be the time at which the mobile device receives data point $d_j^B$. This is illustrated graphically in FIG. 14.

Figure 15:
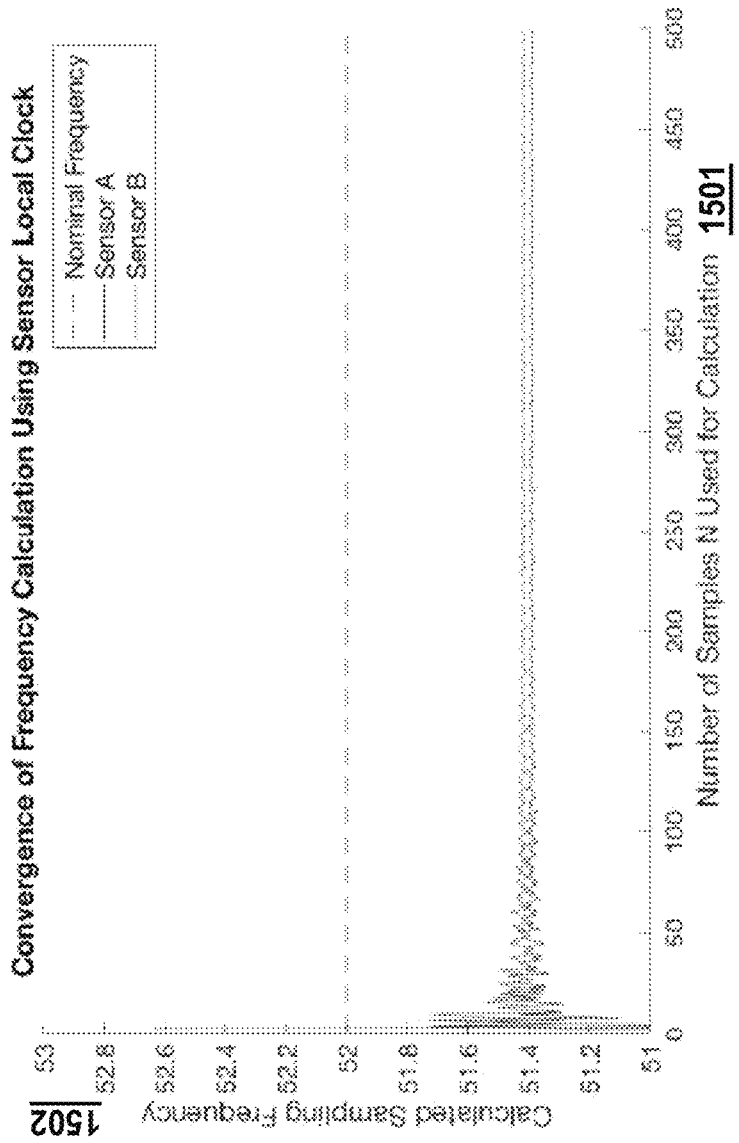
FIG. 15 is a diagram illustrating an analysis for determining how a sensor sampling frequency estimate converges over a range of N data samples, according to an embodiment of the invention.
Figure 16:
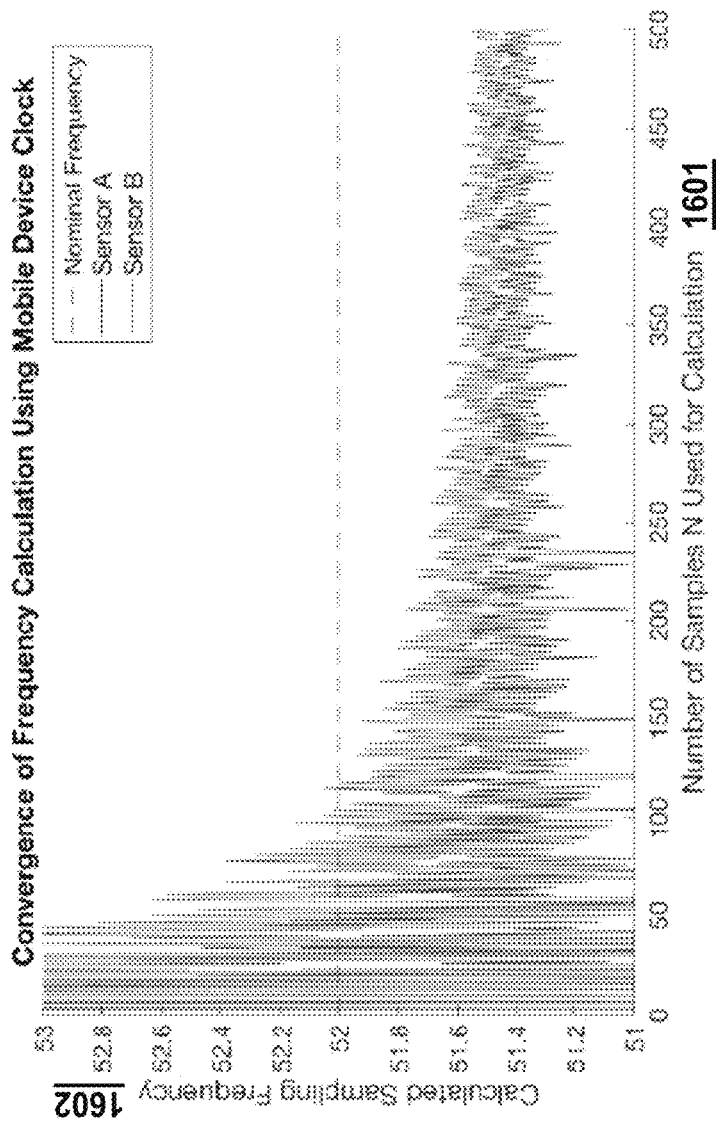
FIG. 16 is a diagram illustrating an analysis for determining how an alternative sensor sampling frequency estimate converges over a range of N data samples, according to an embodiment of the invention.

The comparisons between the convergence of sampling frequency calculation using sensor local clock and mobile device master clock are shown in the FIGS. 15 and 16, respectively. It is clear from the FIGS. 15 and 16 that the calculated sampling frequency converges faster using the sensor local clock in comparison to the mobile device master clock. As shown in FIG. 16 that the variability introduced by the wireless communication results in a much larger number of samples required to approximate sampling frequency. There is a clear advantage in only making use of sensor local clock in that it can provide a more reliable solution. Therefore, external reference time vector is built with a preconfigured fixed or dynamically calculated nominal frequency (for example, 52 Hz) and a linear interpolation condition may be checked for time bounds of the sensor's local clock.

FIG. 15 is a diagram illustrating an exemplary analysis for determining how the sampling frequency approximation varies over a range of values of N, according to an embodiment of the invention. According to the embodiment, an exemplary analysis to determine how the sampling frequency 1502 approximation varies over a range of values of N 1501. Accordingly, a sampling frequency was calculated using the sensor's local clock, and the preconfigured nominal sampling frequency for each sensor (for example, 52 Hz). Note how $f_{nom} \neq f_{A/B}$ and $f_A \neq f_B$. A value of N≥150 will result in a relatively good approximation for $f_{nom}$=52 Hz.

FIG. 16 is a diagram illustrating sampling frequency calculations for a mobile device, according to an embodiment of the invention. According to the embodiment, a sampling frequency calculation using the time at which data were received by a mobile device as described previously is shown. A nominal sampling frequency 1602 for each sensor may be set to, for example, 52 Hz. A frequency calculation does not show good convergence even after, for example, 500 data samples 1601.

Figure 17:
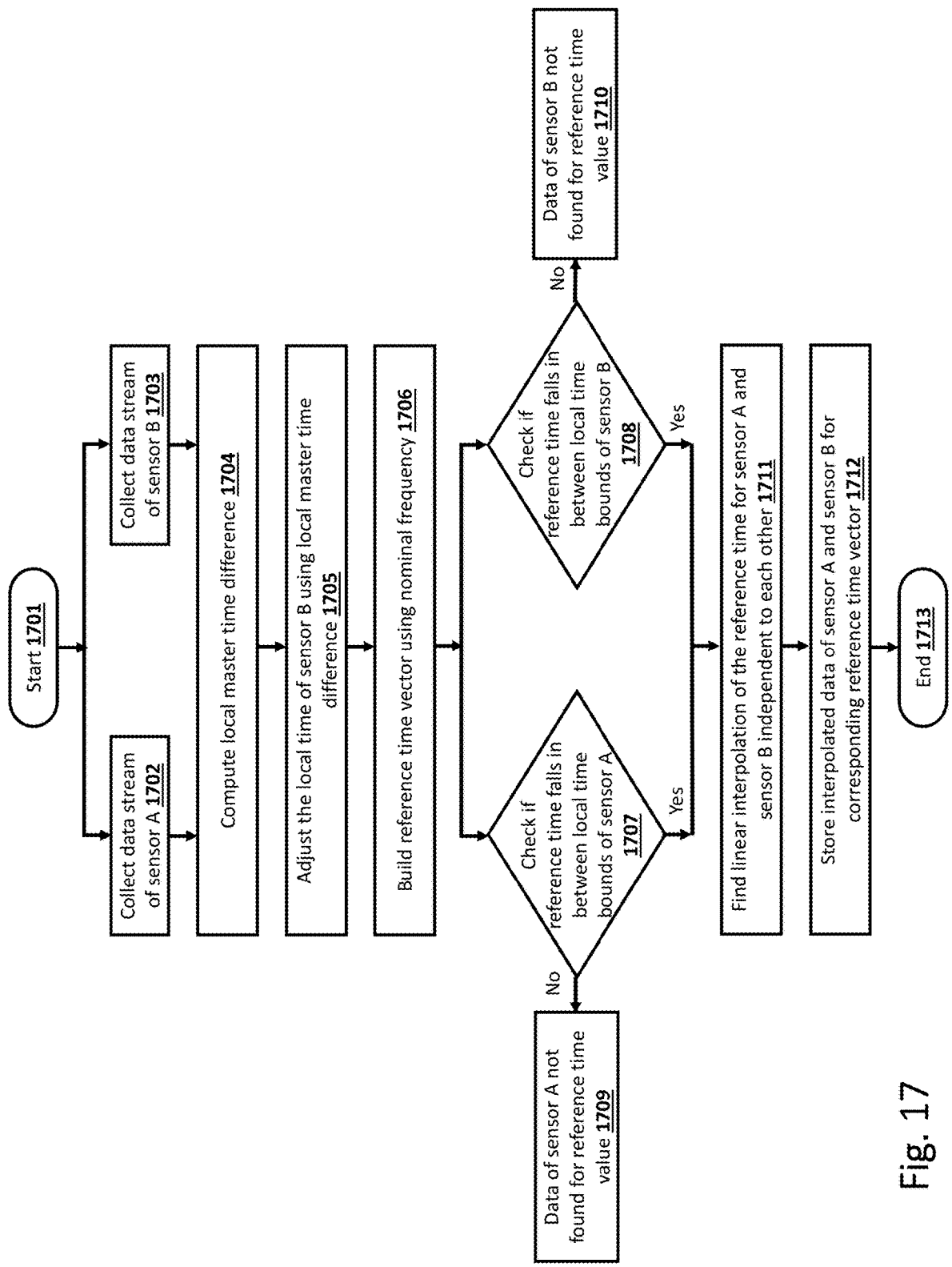
FIG. 17 is a flow diagram illustrating a method for data synchronization for a plurality of sensors, according to a preferred embodiment of the invention.

FIG. 17 is a flow diagram illustrating a method for data synchronization for a plurality of sensors, according to a preferred embodiment of the invention. According to the embodiment, a method for data synchronization starts at a first step 1701. In the next steps, data is streamed from sensor A 701 and sensor B in steps 1702 and 1703. In a next step 1704, a local master time difference is calculated (for example, using data from FIGS. 15 and 16) to compensate for an initial time delay between when sensor A 701 and sensor B 702 started to collect sensor data. Accordingly, an assumption is made that a local time associated to sensor A 701 is designated to be a true time. As such, in a next step 1705, a local time associated to sensor B 702 may be adjusted using a computed local master time difference. In a next step 1706, an external reference time vector is built using a preconfigured fixed or a dynamically calculated nominal frequency, for example, 52 Hz. In some embodiments, a nominal frequency may be dynamically computed at run-time and may be periodically updated at intervals during operation. This external time reference vector may be used to overcome the limitation of the master times recorded by the mobile device as the master times may be variable, it is difficult to identify sampling frequency. In next steps 1707 and 1708, linear interpolations are performed for reference time vector for sensor A 701 and sensor B and analyzed to determine if the reference time value falls between the local time bounds of the sensors. If yes, the linear interpolation is performed in step 1711. If not, data points are ignored, in steps 1709 and 1710, as the reference time does not fall in the local time bounds of the sensor. In a next step 1712, the final linear interpolated data points of sensor A 701 and sensor B are concatenated and stored as the synced data. The method ends in step 1713.

An exemplary routine for data synchronization using two sensors may receive a data stream from each sensor A 701 and sensor B is shown in FIG. 17A. Each data stream may be an eight-column data array which may comprise master time, local time, three-dimensional acceleration measurements, and three-dimensional gyroscope measurements. A preconfigured or dynamically calculated nominal frequency may be provided as an input which may be used to build a reference time vector. Output of this exemplary routine may represent synced data which may be a sixteen-column data array comprising reference time, local time of both sensors, three-dimensional acceleration measurements of both sensors, and three-dimensional gyroscope measurements of both sensors.

Figure 18:
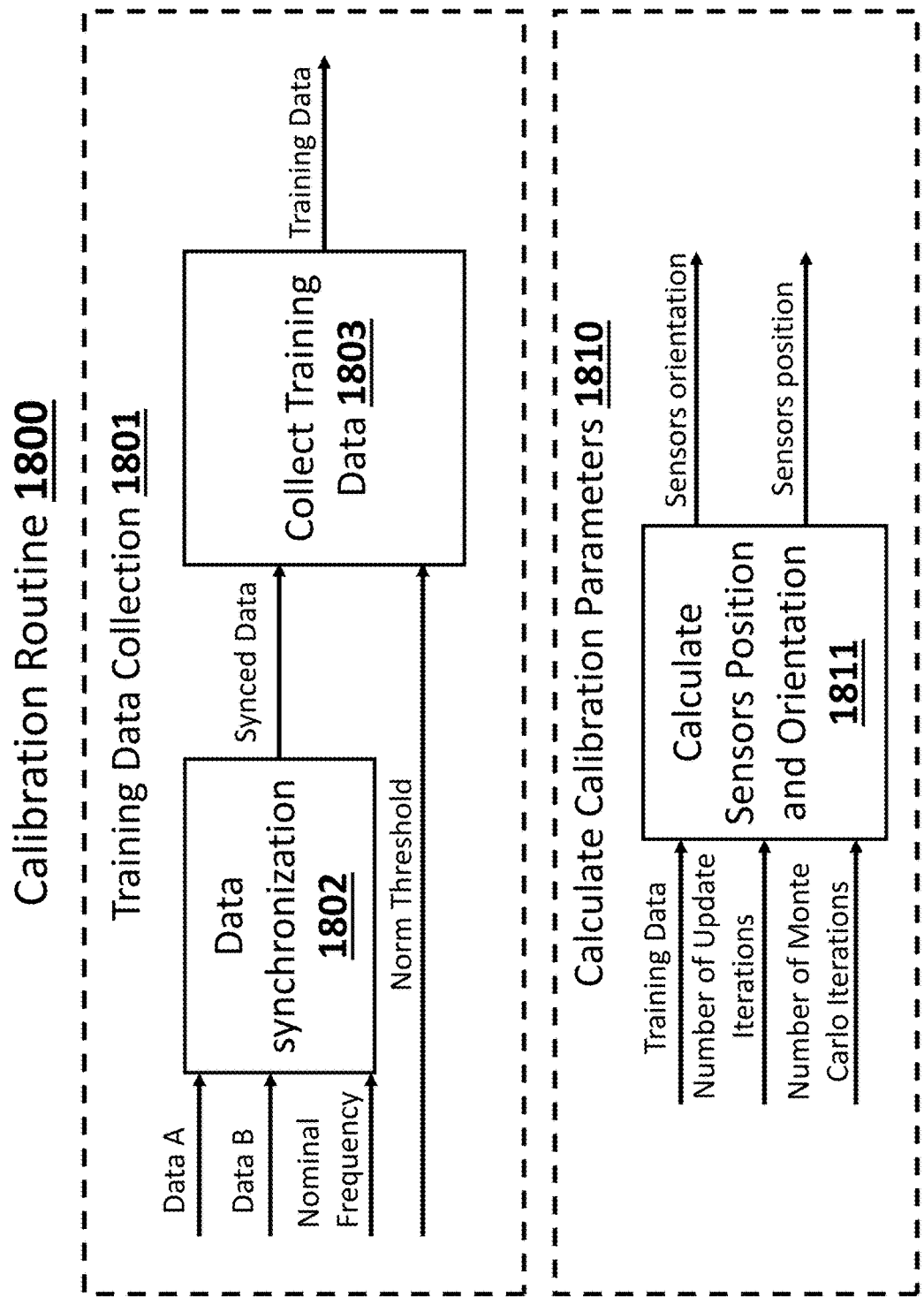
FIG. 18 is a block diagram for calibration comprising data synchronization, training data collection, and sensors position and orientation calculation, according to a preferred embodiment of the invention.

FIG. 18 is a block diagram for calibration comprising data synchronization, training data collection, and sensors position and orientation calculation, according to a preferred embodiment of the invention. According to the embodiment, a calibration routine 1800 may comprise data synchronization 1802, collect training data 1803, and calculation sensor position and orientation 1811. In a preferred embodiment, data synchronization 1802 follows the method described in FIG. 17 for calibration.

In a preferred embodiment, collect training data 1803 may output training data taking synced data, from data synchronization 1802, as input. Accordingly, a time derivative of the angular rate may be computed via a third-order central finite approximation using the gyroscope measurements. Additionally, a norm threshold metric may be given as input to collect training data 1803. The norm threshold metric may be used to select data which comprises sufficient human movements. An exemplary final training data for a two-sensor configuration may comprise 22-column data array which may comprise: reference time, local time of both sensors, three-dimensional accelerometer measurements of both sensors, three-dimensional gyroscope measurements of both sensors, and a time derivate of three-dimensional angular rate measurements of both sensors.

In a preferred embodiment, a calculation of calibration parameters 1810 may comprise calculate sensors position and orientation 1811 that may identify sensors position and orientation given the calibrating training data during human movements (for example, leg movements). According to the embodiment, calculate sensors position and orientation 1811 implements a method for calculating position and orientation of a plurality of sensors according to FIG. 19. Apart from the training data input, other inputs may comprise a number of iterations required for the optimization algorithm such as gradient descent or Gauss-Newton to converge denoted as M, and a number of iterations for various initialization of the sensors position and orientation using a random number generator denoted as N.

FIG. 19 is a flow diagram illustrating a method for calculating position and orientation of a plurality of sensors, according to a preferred embodiment of the invention. In an exemplary embodiment for calculating a knee angle of a human subject, the method starts at a first step 1901. In a next step 1902, a count is initialized to for example, one. In a next step 1903, training data may be collected from sensors placed on a thigh and a calf of a leg. In a next step 1904, an initial orientation and position of the sensors may be initialized using information known a priori or using a sequence of random numbers, for example, using a Monte Carlo algorithm. After the initialization, in a next step 1905, error terms of a constrained optimization may be computed using collected training data. In a next step 1906 sensors position and orientation may be updated using the optimization algorithm for M iterations. In a next step 1907, a root mean square of the error terms may be computed for each of the N iterations i.e., for different initialization of the sensors' position and orientation. Then, for all N iterations, the best sensors position, and orientation estimate is chosen based on a minimum of the root mean square of the error terms computed. An exemplary subroutine for calculating sensors position and orientation is shown in FIG. 19A.

Figure 20:
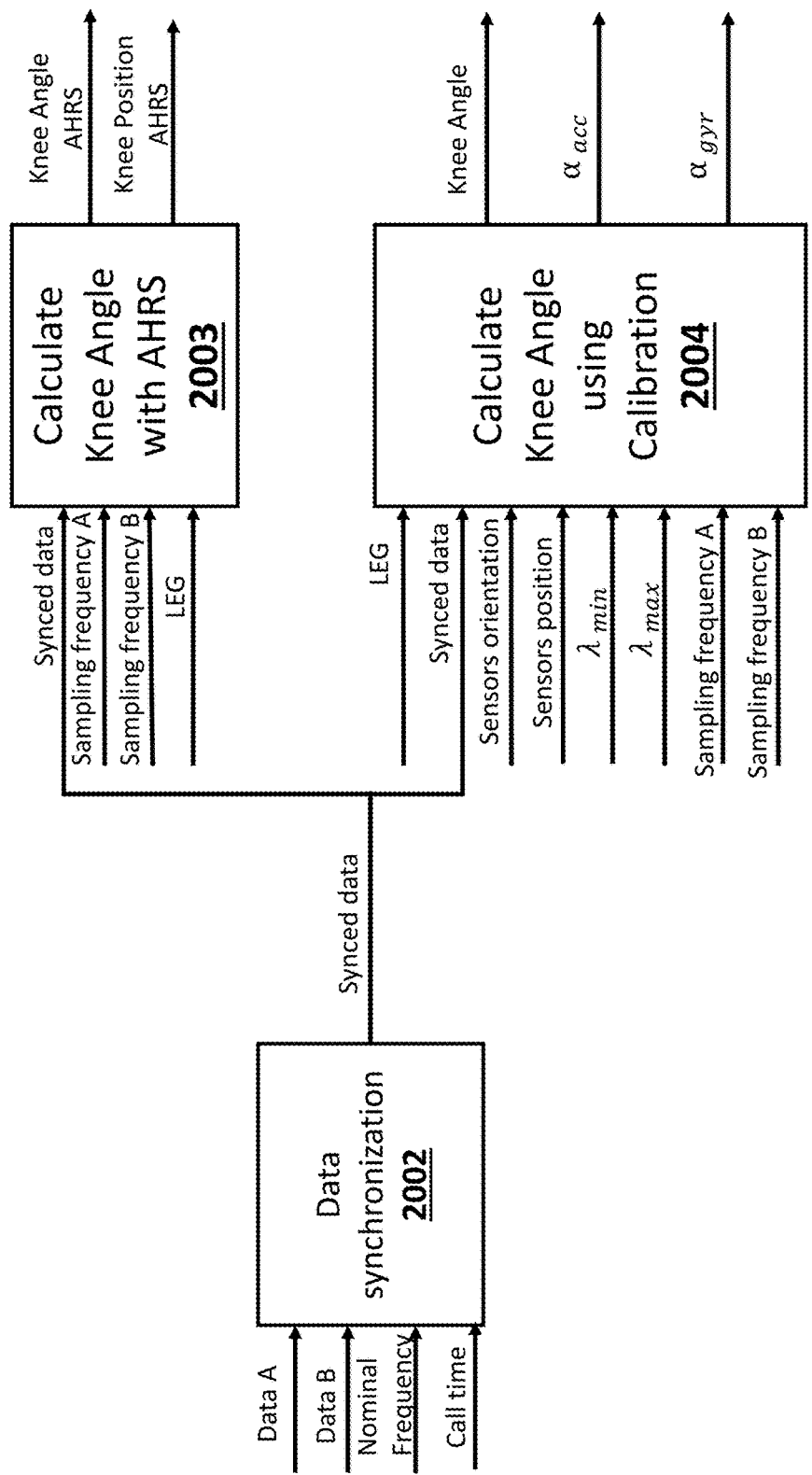
FIG. 20 is a block diagram illustrating real-time calculation of a knee angle, according to a preferred embodiment of the invention.

FIG. 20 is a block diagram illustrating an exemplary real-time calculation 2001 of a knee angle, according to a preferred embodiment of the invention. According to preferred embodiments, there are two approaches for calculating a knee angle in real time. A first method is to calculate knee angle using a quaternion method with attitude and heading reference system (AHRS) 2003. A second method is to calculate knee angle using calibration 2004.

A first step may be to acquire synced data from both the sensors data streams and use synced data, from data synchronization 2002, as input to calculate knee angle with attitude and heading reference system (AHRS) 2003 and calculate knee angle using calibration 2004. In calculate knee angle using calibration 2004, sensors' position and orientation outputted from calculate calibration parameters 1810 may be used as inputs. Further, a sampling frequency of sensor A 701 and sensor B denoted as $f_A$ and $f_B$ may be calculated from fixed nominal frequency and may be used as the inputs. Complementary filter thresholds $\lambda_{min}$ and $\lambda_{max}$ may also fed as the inputs to calculate knee angle using calibration 2004. Additionally, a binary valued attribute called as LEG may be received as an input. In some embodiments, LEG equal to 1 may correspond to a right leg and 0 may correspond to a left leg. Calculate knee angle using calibration 2004 may output fused knee angle estimate using both accelerometer and gyroscope measurements, knee angle estimate only using accelerometer measurements denoted as $\alpha_{acc}$, and knee angle estimate only using gyroscope measurements denoted as $\alpha_{gyr}$. Accordingly, a method for a knee angle calculation using calibration is illustrated in FIG. 21.

Figure 21:
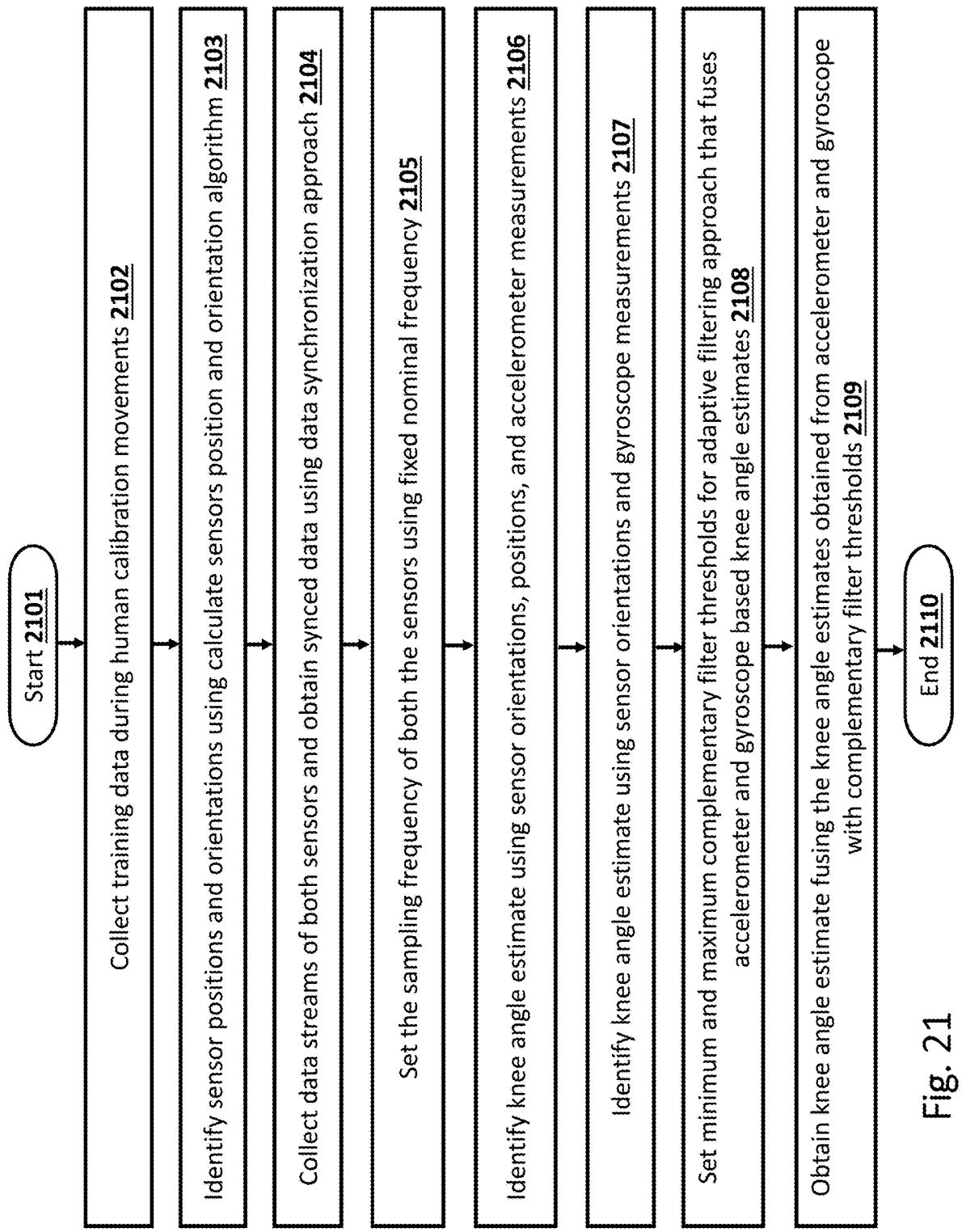
FIG. 21 is a flow diagram illustrating a method for calculating a knee angle using a calibration block, according to an embodiment of the invention.

FIG. 21 is a flow diagram illustrating a method for calculating a knee angle using a calibration, according to an embodiment of the invention. According to the embodiment, the method starts in a first step 2101. In a next step 2102, training data is collected during human calibration movements such as forward cycling, swinging, or walking etc. In a next step 2103, orientation and position for the sensors are identified by applying calculate sensors position and orientation approach. In a next step 2104 data streams may be collected and synced data obtained by applying the data synchronization algorithm. In a next step 2105, sampling frequency of both the sensors may be set to a constant based on the fixed nominal frequency value given as the input to the data synchronization algorithm. In a next step 2106, with the identified sensors orientation and position estimate, and accelerometer measurements, the knee angle estimate using accelerometer measurements denoted as $\alpha_{acc}$ may be calculated. In a next step 2107, with the gyroscope measurements and sensors orientation, the knee angle estimate using gyroscope measurements $\alpha_{gyr}$ may be calculated. In a next step 2108, the complementary filter thresholds $\lambda_{min}$ and $\lambda_{max}$ are received as inputs to build adaptive filtering fusion approach that fuses the knee angle estimates $\alpha_{acc}$ and $\alpha_{gyr}$ using $\lambda_{min}$ and $\lambda_{max}$ in step 2109. The resultant knee angle estimate is considered as robust for both static as well as dynamic human movements as it takes advantage of both accelerometer and gyroscope measurements-based knee angle estimate.

Figure 22:
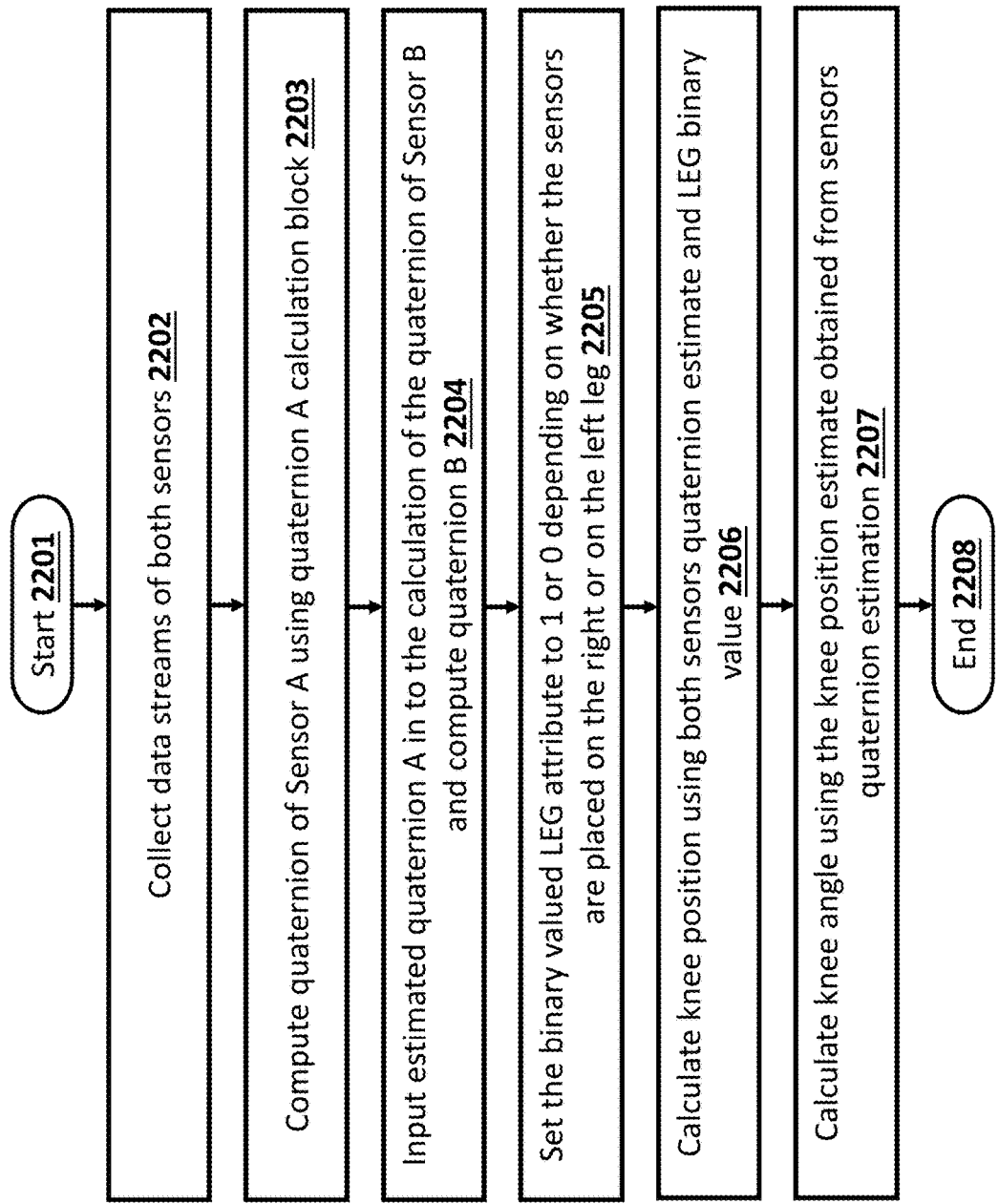
FIG. 22 is a flow diagram illustrating a method for calculating a knee angle using an AHRS block, according to an embodiment of the invention.

FIG. 22 is a flow diagram illustrating a method for calculating a knee angle using knee angle with attitude and heading reference system (AHRS), according to an embodiment of the invention. According to the embodiment, a knee angle calculation with AHRS starts at a first step 2201. In a next step 2202, synced data, sampling frequency of both sensors, and LEG are received as inputs to calculate knee angle with attitude and heading reference system (AHRS) 2003. In a next step 2203, a first quaternion A is computed using quaternion A calculation as shown in FIG. 6. In a next step 2204, estimated quaternion A is fed as an input to the compute a second quaternion B estimate. In a next step 2205, an indication of a placement of the sensors (for example, on either left or right leg) is received as a binary valued attribute LEG. In a next step 2206, using the quaternions estimate and LEG, a knee position is calculated. In a next step 2207, a knee angle is calculated using the estimated knee position.

The skilled person will be aware of a range of possible modifications of the various embodiments described above.

What is claimed is:

1. A system, comprising: at least one first inertial measurement unit (IMU) is positioned on a first member of a joint; at least one second inertial measurement unit (IMU) is positioned on a second member of the joint; wherein the joint is a knee joint of a leg, the first member is a thigh of the leg, and the second member is a calf of the leg; wherein each of the at least one first IMU and the at least one second IMU lacks a magnetometer unit; wherein the at least one first IMU and the at least one second IMU respectively output at least one first IMU sensor data and at least one second IMU sensor data; at least one processing device configured to determine at least one mobility metric of the joint based at least in part on a yaw-constrained computation of: at least one first quaternion based on the at least one first IMU sensor data and at least one second quaternion based on the at least one second IMU sensor data; wherein the at least one first quaternion is a representation relating an Earth coordinate frame to a coordinate frame of the at least one first IMU worn on the first member; wherein the at least one second quaternion is a representation relating the Earth coordinate frame to a coordinate frame of the at least one second IMU worn on the second member; and wherein the at least one processing device is configured to determine the at least one mobility metric of the joint by executing programming instructions that cause the at least one processing to: receive, from the at least one first IMU, the at least one first IMU sensor data; receive, from the at least one second IMU, the at least one second IMU sensor data; input the at least one first IMU sensor data into a quaternion computation algorithm to compute the at least one first quaternion; input the at least one first quaternion and the at least one second IMU sensor data into the quaternion computation algorithm to compute the at least one second quaternion; wherein the inputting of the at least one first quaternion imposes a yaw constraint that reduces an uncertainty in: at least one first yaw axis value in the coordinate frame of the at least one first IMU and at least one second yaw axis value in the coordinate frame of the at least one second IMU; and input the at least one first quaternion and the at least one second quaternion into a calibration parameter algorithm to determine the at least one mobility metric of the joint; wherein the at least one mobility metric comprises at least one joint position and at least one joint angle based on: at least one first orientation and at least one first position of the at least one first IMU on the first member of the joint and at least one second orientation and at least one second position of the at least one second IMU on the second member of the joint.

2. The system according to claim 1, wherein the at least one mobility metric of the joint further comprises a step length, a stride length, and a cadence.

3. The system according to claim 1, further comprising a memory;
   wherein the memory is configured to store a configuration database; and
   wherein the at least one processing device is configured to store system variables, preconfigured nominal frequencies, sensor information and user information in the configuration database.

4. The system according to claim 1, further comprising a mobile device;
   wherein the at least one first IMU is configured to wirelessly transmit the at least one first IMU sensor data to the mobile device;
   wherein the at least one second IMU is configured to wirelessly transmit the at least one second IMU sensor data to the mobile device;
   wherein the mobile device comprises the at least one processing device; and
   wherein the at least one processing device is configured to determine the at least one mobility metric of the joint based at least in part on the at least one first IMU sensor data and the at least one second IMU sensor data.

5. The system according to claim 4, wherein the at least one processing device is configured to receive the at least one first IMU sensor data and the at least one second IMU sensor data over a wireless communication network.

6. The system according to claim 4, wherein the at least one processing device is configured to synchronize the at least one first IMU sensor data and the at least one second IMU sensor data by calculating a local master time difference to compensate for an initial time delay between times that the at least one first IMU and the at least one second IMU start to collect data.

7. The system according to claim 6, wherein the local master time difference is based at least in part on a master clock of the mobile device.

8. The system according to claim 1, wherein the at least one first IMU comprises at least one first accelerometer and at least one first gyroscope;
   wherein the at least one first IMU sensor data comprises at least one first accelerometer sensor data and at least one first gyroscope sensor data;
   wherein the at least one second IMU comprises at least one second accelerometer and at least one second gyroscope;
   wherein the at least one second IMU sensor data comprises at least one second accelerometer sensor data and at least one second gyroscope sensor data; and
   wherein the at least one processing device is configured to use the quaternion computation algorithm to:
      calculate from the at least one first accelerometer sensor data and the at least one first gyroscope sensor data, an estimation of the at least one first quaternion;
         wherein the at least one first quaternion represents at least one first pitch axis value, at least one first roll axis value, and the at least one first yaw axis value in the coordinate frame of the at least one first IMU;
      calculate from the at least one second accelerometer sensor data and the at least one second gyroscope sensor data, an estimation of the at least one second quaternion;
         wherein the at least one second quaternion represents at least one second pitch axis value, at least one second roll axis value, and the at least one second yaw axis value in the coordinate frame of the at least one second IMU; and
   impose the yaw constraint between the at least one first yaw axis value and the at least one second yaw axis value to improve:
      the estimation of the at least one first quaternion and
      the estimation of the at least one second quaternion.

9. The system according to claim 1, wherein the at least one processing device is configured to use the calibration parameter algorithm to compute the at least one mobility metric of the joint by calibrating training data during movements of the joint to determine:
   the at least one first orientation and the at least one first position of the at least one first IMU on the first member of the joint, and
   the at least one second orientation and the at least one second position of the at least one second IMU on the second member of the joint.

10. A method, comprising: receiving, by at least one processing device, from at least one first inertial measurement unit (IMU), at least one first IMU sensor data; wherein the at least one first IMU is positioned on a first member of a joint; receiving, by the at least one processing device, from at least one second inertial measurement unit (IMU), at least one second IMU sensor data; wherein the at least one second IMU is positioned on a second member of the joint; wherein the joint is a knee joint of a leg, the first member is a thigh of the leg, and the second member is a calf of the leg; wherein each of the at least one first IMU and the at least one second IMU lacks a magnetometer unit; wherein the at least one first IMU and the at least one second IMU respectively output the at least one first IMU sensor data and the at least one second IMU sensor data; and determining, by at least one processing device, at least one mobility metric of the joint based at least in part on a yaw-constrained computation of: at least one first quaternion based on the at least one first IMU sensor data and at least one second quaternion based on the at least one second IMU sensor data by: inputting, by the at least one processing device, the at least one first IMU sensor data into a quaternion computation algorithm to compute the at least one first quaternion; wherein the at least one first quaternion is a representation relating an Earth coordinate frame to a coordinate frame of the at least one first IMU worn on the first member; inputting, by the at least one processing device, the at least one first quaternion and the at least one second IMU sensor data into the quaternion computation algorithm to compute the at least one second quaternion; wherein the at least one second quaternion is a representation relating the Earth coordinate frame to a coordinate frame of the at least one second IMU worn on the second member; wherein the inputting of the at least one first quaternion imposes a yaw constraint that reduces an uncertainty in: at least one first yaw axis value in the coordinate frame of the at least one first IMU and at least one second yaw axis value in the coordinate frame of the at least one second IMU; and inputting, by the at least one processing device, the at least one first quaternion and the at least one second quaternion into a calibration parameter algorithm to compute the at least one mobility metric of the joint; wherein the at least one mobility metric comprises at least one joint position of the joint and at least one joint angle of the joint based on: at least one first orientation and at least one first position of the at least one first IMU on the first member of the joint and at least one second orientation and at least one second position of the at least one second IMU on the second member of the joint.

11. The method according to claim 10, wherein the at least one mobility metric of the joint further comprises a step length, a stride length, and a cadence.

12. The method according to claim 10, further comprising storing, by the at least one processing device, system variables, preconfigured nominal frequencies, sensor information and user information in a configuration database in a memory.

13. The method according to claim 10, further comprising a mobile device;
- wherein the at least one first IMU is configured to wirelessly transmit the at least one first IMU sensor data to the mobile device;
- wherein the at least one second IMU is configured to wirelessly transmit the at least one second IMU sensor data to the mobile device;
- wherein the mobile device comprises the at least one processing device; and
- further comprising determining, by the at least one processing device, the at least one mobility metric of the joint based at least in part on the at least one first IMU sensor data and the at least one second IMU sensor data.

14. The method according to claim 13, further comprising receiving, by the at least one processing device, the at least one first IMU sensor data and the at least one second IMU sensor data over a wireless communication network.

15. The method according to claim 13, further comprising synchronizing, by the at least one processing device, the at least one first IMU sensor data and the at least one second IMU sensor data by calculating a local master time difference to compensate for an initial time delay between times that the at least one first IMU and the at least one second IMU start to collect data.

16. The method according to claim 15, wherein the local master time difference is based at least in part on a master clock of the mobile device.

17. The method according to claim 10, wherein the at least one first IMU comprises at least one first accelerometer and at least one first gyroscope;
- wherein the at least one first IMU sensor data comprises at least one first accelerometer sensor data and at least one first gyroscope sensor data;
- wherein the at least one second IMU comprises at least one second accelerometer and at least one second gyroscope;
- wherein the at least one second IMU sensor data comprises at least one second accelerometer sensor data and at least one second gyroscope sensor data; and further comprising:
- calculating, by the at least one processing device, from the at least one first accelerometer sensor data and the at least one first gyroscope sensor data using the quaternion computation algorithm, an estimation of the at least one first quaternion;
  - wherein the at least one first quaternion represents at least one first pitch axis value, at least one first roll axis value, and the at least one first yaw axis value in the coordinate frame of the at least one first IMU;
- calculating, by the at least one processing device, from the at least one second accelerometer sensor data and the at least one second gyroscope sensor data using the quaternion computation algorithm, an estimation of the at least one second quaternion;
  - wherein the at least one second quaternion represents at least one second pitch axis value, at least one second roll axis value, and the at least one second yaw axis value in the coordinate frame of the at least one second IMU; and
- imposing, by the at least one processing device, using the quaternion computation algorithm, the yaw constraint between the at least one first yaw axis value and the at least one second yaw axis value to improve:
  - the estimation of the at least one first quaternion and
  - the estimation of the at least one second quaternion.

18. The method according to claim 10, wherein the at least one processing device is configured to use the calibration parameter algorithm to compute the at least one mobility metric of the joint by calibrating training data during movements of the joint to determine:
- the at least one first orientation and the at least one first position of the at least one first IMU on the first member of the joint, and
- the at least one second orientation and the at least one second position of the at least one second IMU on the second member of the joint.

\* \* \* \* \*